US012806767B2

(12) United States Patent
Goto et al.

(10) Patent No.: US 12,806,767 B2
(45) Date of Patent: Nov. 24, 2026

(54) ROBOT APPARATUS, SENSOR APPARATUS, AND CONTROL DEVICE

(71) Applicant: SONY GROUP CORPORATION, Tokyo (JP)

(72) Inventors: Tetsuro Goto, Tokyo (JP); Takehiro Misonou, Kanagawa (JP); Ken Kobayashi, Kanagawa (JP); Hayato Hasegawa, Kanagawa (JP); Yoshiaki Sakakura, Kanagawa (JP); Manami Miyawaki, Kanagawa (JP); Kei Tsukamoto, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 107 days.

(21) Appl. No.: 18/566,970

(22) PCT Filed: Feb. 17, 2022

(86) PCT No.: PCT/JP2022/006384
§ 371 (c)(1),
(2) Date: Dec. 4, 2023

(87) PCT Pub. No.: WO2022/264517
PCT Pub. Date: Dec. 22, 2022

(65) Prior Publication Data

US 2024/0269829 A1 Aug. 15, 2024

(30) Foreign Application Priority Data

Jun. 15, 2021 (JP) ................................ 2021-099580

(51) Int. Cl.
*B25J 9/16* (2006.01)
*B25J 13/08* (2006.01)
*B25J 15/08* (2006.01)

(52) U.S. Cl.
CPC .......... *B25J 9/1612* (2013.01); *B25J 9/1653* (2013.01); *B25J 13/082* (2013.01); *B25J 15/08* (2013.01)

(58) Field of Classification Search
CPC ...... B25J 9/1612; B25J 9/1653; B25J 13/082; B25J 15/08; B25J 13/08
See application file for complete search history.

(56) References Cited

U.S. PATENT DOCUMENTS

2009/0031825 A1* 2/2009 Kishida .................. G01L 5/228 73/862.621
2009/0076657 A1* 3/2009 Tsuboi ................ G05B 13/021 700/275

(Continued)

FOREIGN PATENT DOCUMENTS

JP H05-69372 3/1993
JP 2003236786 A 8/2003

(Continued)

OTHER PUBLICATIONS

International Search Report and Written Opinion prepared by the Japan Patent Office on Apr. 22, 2022, for International Application No. PCT/JP2022/006384, 2 pgs.

*Primary Examiner* — Khoi H Tran
*Assistant Examiner* — Matthew C Gammon
(74) *Attorney, Agent, or Firm* — SHERIDAN ROSS P.C.

(57) ABSTRACT

A robot apparatus according to an embodiment of the present technology includes a hand portion, an elastically deformable sensor portion, and a control device. The hand portion includes at least two finger portions each having a holding surface capable of holding a workpiece. The sensor portion is disposed on the holding surface of at least one finger portion of the two finger portions and includes a plurality of detection elements that detects a pressure acting on the holding surface. The control device includes a signal (Continued)

generation section capable of generating a hold command to cause the hand portion to hold the workpiece with a predetermined holding force and capable of correcting the holding force on the basis of an output of the sensor portion and a duration of an operation of holding the workpiece.

10 Claims, 24 Drawing Sheets

(56) References Cited

U.S. PATENT DOCUMENTS

| | | | | |
|---|---|---|---|---|
| 2010/0131101 | A1 | 5/2010 | Engeberg | |
| 2018/0235719 | A1* | 8/2018 | Jarc | A61B 34/35 |
| 2021/0285831 | A1* | 9/2021 | Hotta | G01L 5/165 |

FOREIGN PATENT DOCUMENTS

| | | | | |
|---|---|---|---|---|
| JP | 2009-034742 | | 2/2009 | |
| JP | 2009-066714 | | 4/2009 | |
| JP | 2017087325 | A | 5/2017 | |
| JP | 2018202497 | A | 12/2018 | |
| JP | 2019-002905 | | 1/2019 | |
| JP | 2019-098406 | | 6/2019 | |
| JP | 2021016908 | A | 2/2021 | |
| WO | WO-2018061416 | A1 * | 4/2018 | G06F 3/044 |

* cited by examiner

ROBOT APPARATUS, SENSOR APPARATUS, AND CONTROL DEVICE

CROSS REFERENCE TO RELATED APPLICATIONS

This application is a national stage application under 35 U.S.C. 371 and claims the benefit of PCT Application No. PCT/JP2022/006384, having an international filing date of 17 Feb. 2022, which designated the United States, which PCT application claimed the benefit of Japanese Patent Application No. 2021-099580, filed 15 Jun. 2021, the entire disclosures of each of which are incorporated herein by reference.

TECHNICAL FIELD

The present technology relates to a robot apparatus that includes a hand portion capable of detecting a pressure acting on a holding surface.

BACKGROUND ART

In recent years, automation of work using a robot has been discussed in various scenes as working population is reduced. There is a need to detect what extent of force is acting on a surface of a robot hand in order to highly accurately control the behavior of the robot hand. For example, Patent Literature 1 below discloses a robot hand that includes a haptic sensor capable of detecting not only a pressing force but also a shear stress or a slide friction.

CITATION LIST

Patent Literature

Patent Literature 1: Japanese Patent Application Laid-open No. 2019-2905

DISCLOSURE OF INVENTION

Technical Problem

In a robot hand that holds an object (workpiece) in a factory, a shop, or the like, there is a problem that when an indefinite-shaped object, a soft object, a small object, a slippy object, or the like is held, the object will be dropped if the robot hand does not hold the object with an appropriate force. In particular, many stretchy and flexible materials are used in a sensor for detecting a holding force, and due to their viscoelastic behavior, it may be difficult to stably continue to hold the workpiece with a constant holding force.

In view of the circumstances as described above, it is an object of the present technology to provide a robot apparatus, a sensor apparatus, and a control device that are capable of holding a workpiece with a stable holding force.

Solution to Problem

A robot apparatus according to an embodiment of the present technology includes a hand portion, an elastically deformable sensor portion, and a control device.

The hand portion includes at least two finger portions each having a holding surface capable of holding a workpiece.

The sensor portion is disposed on the holding surface of at least one finger portion of the two finger portions and includes a plurality of detection elements that detects a pressure acting on the holding surface.

The control device includes a signal generation section capable of generating a hold command to cause the hand portion to hold the workpiece with a predetermined holding force and capable of correcting the holding force on the basis of an output of the sensor portion and a duration of an operation of holding the workpiece.

According to the sensor apparatus described above, it is possible to stably hold a workpiece with a constant holding force while suppressing a decrease in the holding force along with a stress relaxation phenomenon.

The signal generation section may be configured to calculate a correction coefficient for correcting the holding force on the basis of drift characteristics of the output of the sensor portion with respect to a constant load acquired in advance.

The signal generation section may be configured to generate the hold command on the basis of an addition value of a pressure value, which is calculated on the basis of a sum of outputs of the plurality of detection elements, and a correction value, which is obtained by multiplying the pressure value by the correction coefficient.

The control device may further include a computing section that calculates a load vertical to the holding surface and a shear force parallel to the holding surface on the basis of the output of the sensor portion.

The hand portion may further include an actuator capable of driving the finger portions at a minimum feed rate of less than 100 μm, and the control device may be configured to control the actuator in a position control cycle of 20 Hz or more.

The sensor portion may include a first pressure sensor located on the workpiece side, a second pressure sensor located on the holding surface side, and a separation layer that is disposed between the first pressure sensor and the second pressure sensor and is made of a viscoelastic material that is deformed by a load applied to the first pressure sensor.

Each of the first pressure sensor and the second pressure sensor may include a sensor electrode layer including a plurality of capacitive elements two-dimensionally disposed in a plane parallel to the holding surface, a reference electrode layer, and a deformation layer disposed between the sensor electrode layer and the reference electrode layer.

The sensor apparatus may further include a viscoelastic body layer. The viscoelastic body layer is configured to be disposed on a surface of the first pressure sensor and made of a viscoelastic material that is deformable on the first pressure sensor in an in-plane direction parallel to the holding surface.

A sensor apparatus according to an embodiment of the present technology includes an elastically deformable sensor portion and a control device.

The sensor portion is disposed on a holding surface of a hand portion of a robot apparatus and detects a pressure acting on the holding surface.

The control device includes a signal generation section capable of generating a hold command to cause the hand portion to hold a workpiece with a constant holding force and capable of correcting the holding force on the basis of an output of the sensor portion and a duration of an operation of holding the workpiece.

A control device according to an embodiment of the present technology includes a signal generation section.

The signal generation section is configured to be capable of generating a hold command to cause a hand portion of a robot apparatus to hold a workpiece with a constant holding force and capable of correcting the holding force on the basis of an output of an elastically deformable sensor portion that detects a pressure acting on a holding surface of the hand portion, and a duration of an operation of holding the workpiece.

MODE(S) FOR CARRYING OUT THE INVENTION

Hereinafter, embodiments according to the present technology will be described with reference to the drawings.

First Embodiment

Figure 1:
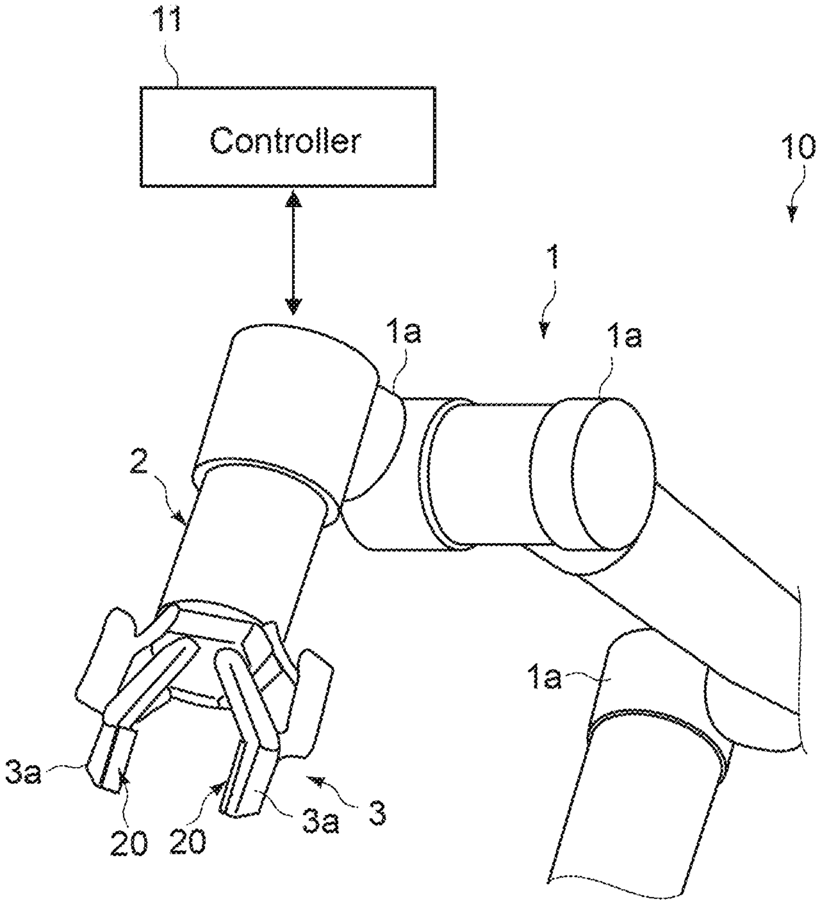
FIG. 1 is a perspective view of a main part of a robot apparatus including a sensor apparatus according to an embodiment of the present technology.

FIG. 1 is a perspective view of a main part of a robot apparatus 10 including a sensor apparatus 20 according to an embodiment of the present technology. In this embodiment, the robot apparatus 10 constitutes a robot hand. Hereinafter, a configuration of the robot apparatus 10 will be schematically described.

[Robot Apparatus]

As shown in FIG. 1, the robot apparatus 10 includes an arm portion 1, a wrist portion 2, and a hand portion 3.

The arm portion 1 includes a plurality of joint portions 1*a*, and the hand portion 3 can be moved to any position by the joint portions 1*a* being driven. The wrist portion 2 is rotatably connected to the arm portion 1, and the hand portion 3 can be rotated by the rotation of the wrist portion 2.

The hand portion 3 includes two finger portions 3*a* that face each other, and a target object (workpiece) can be held between the two finger portions 3*a* by the two finger portions 3*a* being driven. Note that the hand portion 3 is configured as a two-finger configuration in the example shown in FIG. 1, but the number of finger portions 3*a* can be changed appropriately to three, four or more, or the like.

Sensor apparatuses 20 are provided to the surfaces facing each other of the two finger portions 3*a*. The sensor apparatus 20 has a pressure detection surface, and is capable of detecting a force that is applied to the pressure detection surface in a vertical direction (Z-axis direction) and is also capable of detecting a force that is applied in an in-plane direction (X-axis direction and Y-axis direction) of the pressure detection surface. In other words, the sensor apparatus 20 is a three-axis sensor capable of detecting forces corresponding to the directions of the three axes. Note that the configuration of the sensor apparatus 20 will be described later with reference to FIG. 2 and the like.

The robot apparatus 10 is driven by the control of a controller 11. The controller 11 includes a control section, a storage section, and the like. The control section is, for example, a central processing unit (CPU) and controls driving of each portion of the robot apparatus 10 on the basis of a program stored in the storage section. The controller 11 may be a dedicated device in the robot apparatus 10 or may be a general-purpose apparatus. The controller 11 may be, for example, a personal computer (PC) connected to the robot apparatus 10 through a wired or wireless connection, a server apparatus on a network, or the like.

[Sensor Apparatus]

Figure 2:
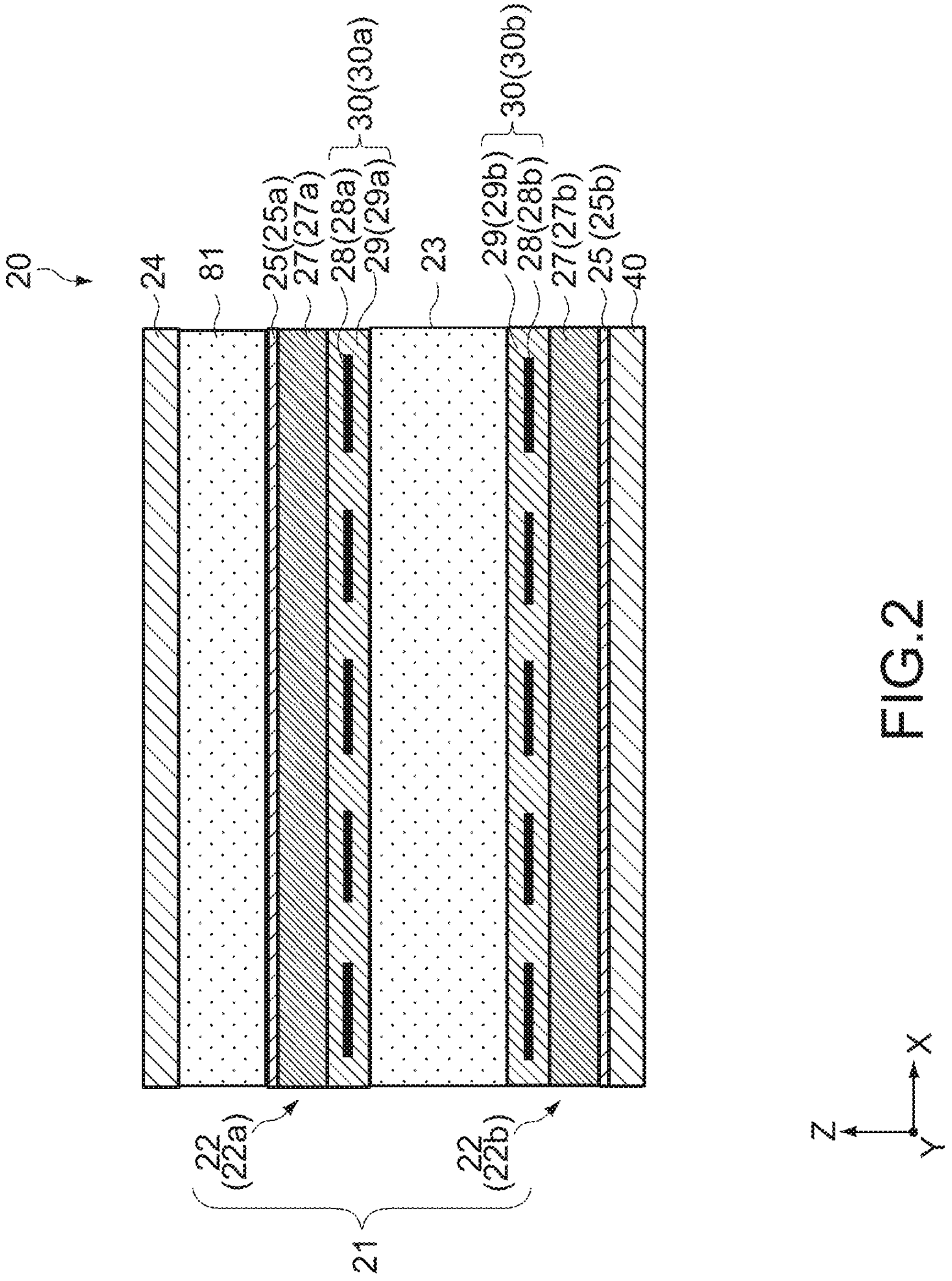
FIG. 2 is a cross-sectional view of the sensor apparatus as viewed laterally.
Figure 3:
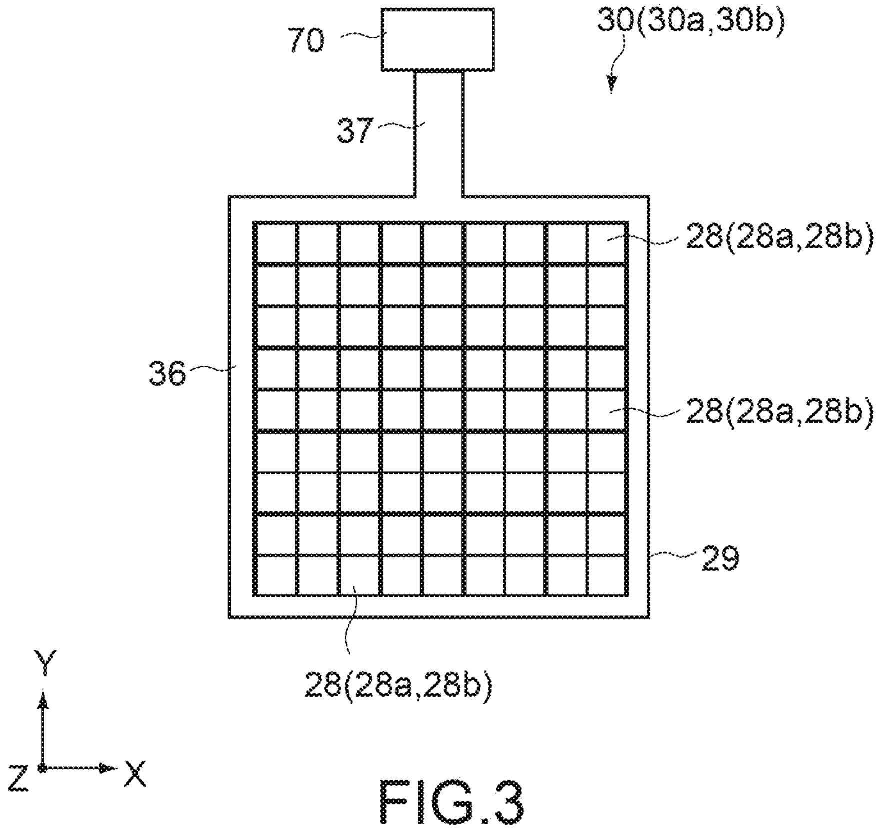
FIG. 3 is a plan view of an electrode layer in the sensor apparatus.

FIG. 2 is a cross-sectional view of the sensor apparatus 20 as viewed laterally. FIG. 3 is a plan view of an electrode layer 30 in the sensor apparatus 20.

In each figure of the sensor apparatus 20, the X-axis direction and the Y-axis direction are directions parallel to a sensing surface that is a pressure detection surface of the sensor apparatus 20 (hereinafter, also referred to as in-plane direction), and the Z-axis direction is a direction vertical to the sensing surface (hereinafter, also referred to as vertical direction). Note that, in FIG. 2, the upper side corresponds to the front side to which an external force is applied, and the lower side corresponds to the back side opposite to the front side.

As shown in FIGS. 2 and 3, the sensor apparatus 20 has a shape of a rectangular flat plate as a whole in plan view. Note that, typically, the shape of the sensor apparatus 20 in plan view only needs to be appropriately set according to the shape of a portion in which the sensor apparatus 20 is disposed, and the shape of the sensor apparatus 20 in plan view is not particularly limited. For example, the shape of the sensor apparatus 20 in plan view may be a polygon other than a rectangle, a circle, or an ellipse.

The sensor apparatus 20 includes a sensor portion 21 including a first pressure sensor 22*a* located on the front side (workpiece side) and a second pressure sensor 22*b* located on the back side (holding surface side), and a separation layer 23 disposed between the first pressure sensor 22*a* and the second pressure sensor 22*b*. In other words, the sensor apparatus 20 has a structure in which the second pressure sensor 22*b*, the separation layer 23, and the first pressure sensor 22*a* are stacked in this order from the lower layer side in the vertical direction. Note that, in the following description, the two pressure sensors 22*a* and 22*b* will be each simply referred to as a pressure sensor 22 if they are not particularly distinguished from each other.

The sensor apparatus 20 further includes a viscoelastic body layer 81 disposed on the upper side (front surface side) of the first pressure sensor 22*a*. As will be described later, the viscoelastic body layer 81 transmits an external force to the sensor portion 21 while being deformed according to the external force.

The viscoelastic body layer 81 is covered with a surface layer 24. The surface layer 24 is made of any flexible material such as a plastic film, a woven fabric, a nonwoven fabric, rubber, or leather. When the robot apparatus 10 holds a target object using the finger portions 3*a*, the surface layer 24 becomes a contact surface that comes into contact with the target object and also functions as a pressure detection surface that receives a load (reaction force of holding force) applied by the target object during the holding operation. Therefore, in order to stably hold the target object, the surface layer 24 favorably has surface properties by which a frictional force equal to or larger than a predetermined value is obtained between the target object and the surface layer 24.

(Sensor Portion)

Subsequently, the sensor portion 21 will be described in detail.

The sensor portion 21 detects a force (shear force Fs) applied to the sensor apparatus 20 in the in-plane direction on the basis of a pressure center position (pressure detection position) in the in-plane direction detected by the first pressure sensor 22*a* and a pressure center position (pressure detection position) in the in-plane direction detected by the second pressure sensor 22*b*. Further, the sensor portion 21 detects a force (load Fz) applied to the sensor apparatus 20 from the upper side in the vertical direction on the basis of a value of the pressure detected by the first pressure sensor 22*a*.

Note that the sensor portion 21 may detect a force applied to the sensor apparatus 20 from the upper side in the vertical direction on the basis of two values, the value of the pressure detected by the first pressure sensor 22*a* and the value of the pressure detected by the second pressure sensor 22*b*. In other words, typically, the sensor portion 21 only needs to be configured to detect a force applied from the upper side in the vertical direction on the basis of the value of the pressure detected by at least the first pressure sensor 22*a* in the first pressure sensor 22*a* and the second pressure sensor 22*b*.

The first pressure sensor 22*a* and the second pressure sensor 22*b* are disposed to face each other in the vertical direction. The first pressure sensor 22*a* has a structure in which a sensor electrode layer 30*a*, a deformation layer 27*a*, and a reference electrode layer 25*a* are stacked in this order from the lower layer side in the vertical direction via adhesive layers (not shown) therebetween.

Further, the second pressure sensor 22*b* has a structure in which a reference electrode layer 25*b*, a deformation layer 27*b*, and a sensor electrode layer 30*b* are stacked in this order from the lower layer side in the vertical direction via adhesive layers (not shown) therebetween.

As can be seen from the description herein, the first pressure sensor 22*a* and the second pressure sensor 22*b* are disposed such that their layer arrangements are upside down in the vertical direction. Thus, both the first pressure sensor 22*a* and the second pressure sensor 22*b* have a configuration in which the sensor electrode layer 30 is disposed on the separation layer 23 side. Note that the first pressure sensor 22*a* and the second pressure sensor 22*b* basically have a similar configuration except that their layer arrangements are upside down in the vertical direction. Note that the first pressure sensor 22*a* and the second pressure sensor 22*b* may be disposed such that their layer arrangements are the same in the vertical direction.

Note that, in the following description, the two sensor electrode layers 30*a* and 30*b* will be each simply referred to as a sensor electrode layer 30 if they are not particularly distinguished from each other, and the two deformation layers 27*a* and 27*b* will be each simply referred to as a deformation layer 27 if they are not particularly distinguished from each other. Further, the two reference electrode layers 25*a* and 25*b* will be each simply referred to as a reference electrode layer 25 if they are not particularly distinguished from each other.

The sensor electrode layer 30 includes a flexible printed circuit board or the like. As shown in FIG. 3, the sensor electrode layer 30 includes a main body 36 that is rectangular in plan view, and an extended portion 37 that extends outward from the main body 36. Note that the shape of the sensor electrode layer 30 in plan view is not limited to a rectangular shape and can be appropriately changed.

The extended portion 37 is equipped with a control unit 70 as a control device that calculates a force in the in-plane direction on the basis of information of the pressure detected by the pressure sensor 22. The control unit 70 is typically a computer including a central processing unit (CPU) and includes an integrated circuit such as an IC chip. The control unit 70 is mounted on the sensor electrode layer 30 (extended portion 37) of one of the first pressure sensor 22*a* and the second pressure sensor 22*b* and is configured to input output signals from the pressure sensors 22*a* and 22*b*. Note that the control unit 70 is not limited to the example in which the control unit 70 is mounted on the sensor electrode layer 30.

The sensor electrode layer 30 includes a base material 29 having flexibility, and a plurality of sensing portions 28 provided on a front surface of the base material 29 or provided inside the base material 29.

For example, a polymer resin such as polyethylene terephthalate, polyimide, polycarbonate, or an acrylic resin is used as the material of the base material 29.

The sensing portions 28 are regularly arranged in a matrix at predetermined intervals in directions of length and width (length: the Y-axis direction, width: the X-axis direction). In the example shown in FIG. 3, the number of sensing portions 28 is 25 in total with five×five (length×width). Note that the number of sensing portions 28 can be appropriately changed. Further, the number of sensing portions 28 may be the same in the sensor electrode layers 30*a* and 30*b* or may be different from each other.

Figure 4:
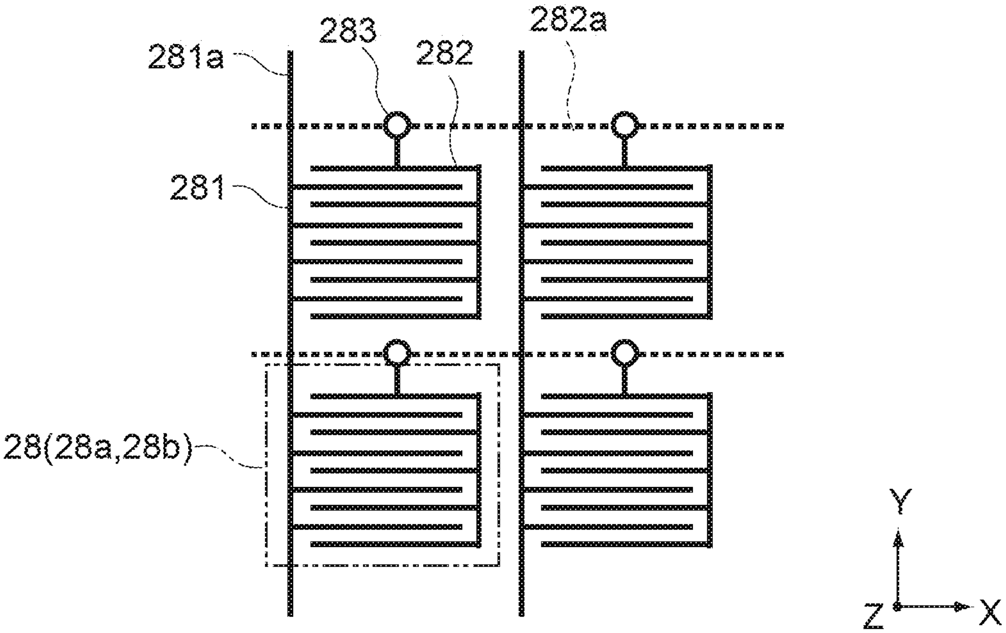
FIG. 4 is a plan view of a main part, showing a configuration example of a sensing portion in the sensor apparatus.

The sensing portion 28 includes a capacitive element (detection element) capable of detecting a change in distance from the reference electrode layer 25 as a change in capacitance. For example, as shown in FIG. 4, the sensing portion 28 includes a comb-teeth-shaped pulse electrode 281 and a comb-teeth-shaped sense electrode 282. The comb-teeth-shaped pulse electrode 281 and the comb-teeth-shaped sense electrode 282 are disposed such that their comb teeth face each other. Each sensing portion 28 includes a region (node area) in which the comb teeth of one of the comb-teeth-shaped pulse electrode 281 and the comb-teeth-shaped sense electrode 282 are disposed to enter spaces formed between the comb teeth of the other one of the comb-teeth-shaped pulse electrode 281 and the comb-teeth-shaped sense electrode 282. Each pulse electrode 281 is connected to a wiring portion 281*a* extending in the Y-axis direction, and each sense electrode 281 is connected to a wiring portion 282*a* extending in the X-axis direction. The wiring portions 281*a* are arranged in the X-axis direction on the front surface of the base material 29, and the wiring portions 282*a* are arranged in the Y-axis direction on the back surface of the base material 29. Each sense electrode 282 is electrically connected to the wiring portion 282*a* via a through-hole 283 provided in the base material 29. The sensor electrode layer 30 may include a ground line. The ground line is provided to, for example, an outer peripheral portion of the sensor electrode layer 30 or a portion in which the wiring portions 281*a* and 282*a* are arranged side by side.

Note that the type of the sensing portion 28 is not limited to the example described above, and any type may be used. For example, the sensor electrode layer 30 may be formed of a laminate of a first electrode sheet having a lattice-shaped first electrode pattern extending in the X-axis direction and a second electrode sheet having a lattice-shaped second electrode pattern extending in the Y-axis direction. In this case, the sensing portion 28 is formed at an intersection of the first electrode pattern and the second electrode pattern.

The reference electrode layer 25 is a so-called grounding electrode and is connected to a ground potential. The reference electrode layer 25 has flexibility and has a thickness of, for example, approximately 0.05 μm to 0.5 μm. For example, an inorganic conductive material, an organic conductive material, or a conductive material including both the inorganic conductive material and the organic conductive material is used as the material of the reference electrode layer 25.

Examples of the inorganic conductive material include metals such as aluminum, copper, and silver, alloys such as stainless steel, and metal oxides such as zinc oxide and indium oxide. Further, examples of the organic conductive material include carbon materials such as carbon black and carbon fibers, and conductive polymers such as substituted or unsubstituted polyaniline and polypyrrole. The reference electrode layer 25 may be formed of a thin metal plate made of stainless steel, aluminum, or the like, a conductive fiber, a conductive nonwoven fabric, or the like. The reference electrode layer 25 may be formed on a plastic film by, for example, a method such as vapor deposition, sputtering, bonding, or coating.

The reference electrode layer 25 constituting the second pressure sensor 22*b* is attached to a surface of the finger portion 3*a* of the robot apparatus 10 via a support 40. The support 40 is typically an adhesive layer such as a double-sided tape.

The deformation layer 27 is disposed between the sensor electrode layer 30 and the reference electrode layer 25. The deformation layer 27 has a thickness of, for example, approximately 100 μm to 1000 μm.

The deformation layer 27 is configured to be elastically deformable in response to an external force. When an external force is applied to the sensor apparatus 20 in the vertical direction, the deformation layer 27 elastically deforms in response to the external force, and the reference electrode layer 25 approaches the sensor electrode layer 30. At that time, a capacitance between the pulse electrode 281 and the sense electrode 282 changes in the sensing portion 28, and thus the sensing portion 28 is capable of detecting such a change in capacitance as a pressure value.

The thickness of the deformation layer 27 is set to be, for example, larger than 100 μm and equal to or less than 1000 μm, and the basis weight of the deformation layer 27 is set to be, for example, 50 mg/cm$^2$ or less. Setting the thickness and the basis weight of the deformation layer 27 within the above ranges makes it possible to improve the detection sensitivity of the pressure sensor 22 in the vertical direction.

A lower limit of the thickness of the deformation layer 27 is not particularly limited unless the lower limit is larger than 100 μm, and the lower limit may be, for example, 150 μm or more, 200 μm or more, 250 μm or more, or 300 μm or more.

Further, an upper limit of the thickness of the deformation layer 27 is not particularly limited unless the upper limit is 1000 μm or less, and the upper limit may be, for example, 950 μm or more, 900 μm or less, 850 μm or less, or 800 or less.

The deformation layer 27 may be formed of, for example, a patterning structure including a column structure. Various structures such as a matrix structure, a stripe structure, a mesh structure, a radial structure, a geometric structure, and a spiral structure may be adopted as the patterning structure.

(Separation Layer)

The separation layer 23 is fixed between the first pressure sensor 22*a* and the second pressure sensor 22*b* via adhesive layers (not shown). The separation layer 23 is made of a viscoelastic material that is deformed by a load applied to the first pressure sensor 22*a* through the surface layer 24 and the viscoelastic body layer 81. Examples of this type of viscoelastic material include a silicon gel, a urethane gel, synthetic rubber, and foam. A thickness of the separation layer 23 is not particularly limited, and is, for example, 1000 μm or more and 5000 μm or less and set according to a thickness of the viscoelastic body layer 81, or the like. A planar shape of the separation layer 23 is not particularly limited, and is typically rectangular or circular.

(Viscoelastic Body Layer)

The viscoelastic body layer 81 is disposed between the surface layer 24 and the first pressure sensor 22*a* (surface of first pressure sensor 22*a*) via adhesive layers (not shown). The viscoelastic body layer 81 is made of a viscoelastic material that is deformable on the first pressure sensor 22*a* in the in-plane direction. Examples of this type of viscoelastic material include a silicon gel, a urethane gel, synthetic rubber, and foam. The thickness of the viscoelastic body layer 81 is not particularly limited, and is, for example, 1000 μm or more and 5000 μm or less and set according to the thickness of the separation layer 23, or the like.

As will be described later, the viscoelastic body layer 81 is provided to divide, in the in-plane direction, a multiple-axis force applied to the surface layer 24 and to detect a shear force distribution (also referred to as shear distribution or multi-point shear) in the surface of the surface layer 24. Therefore, the viscoelastic body layer 81 is favorably made of a viscoelastic material that is more easily deformed in the in-plane direction than the deformation layer 27*a* constituting the first pressure sensor 22*a*.

(Control Unit)

The sensor apparatus 20 further includes the control unit 70. The control unit 70 includes a control section, a storage section, and the like. The control section is, for example, a central processing unit (CPU), and executes a program stored in the storage section on the basis of a control command from the controller 11, to control driving of each portion in the hand portion 3. Typically, the control unit 70 acquires information of forces in directions of three axes, which are detected by the sensor apparatus 20, and controls the driving of the hand portion 3 so as to stably hold a target object with a suitable holding force on the basis of the information of the forces.

The storage section includes a nonvolatile memory in which various programs and data necessary for processing of the control section are stored, and a volatile memory used as a work area of the control section. Various programs may be read from a portable recording medium such as a semiconductor memory, or may be downloaded from a server apparatus on a network.

Figure 5:
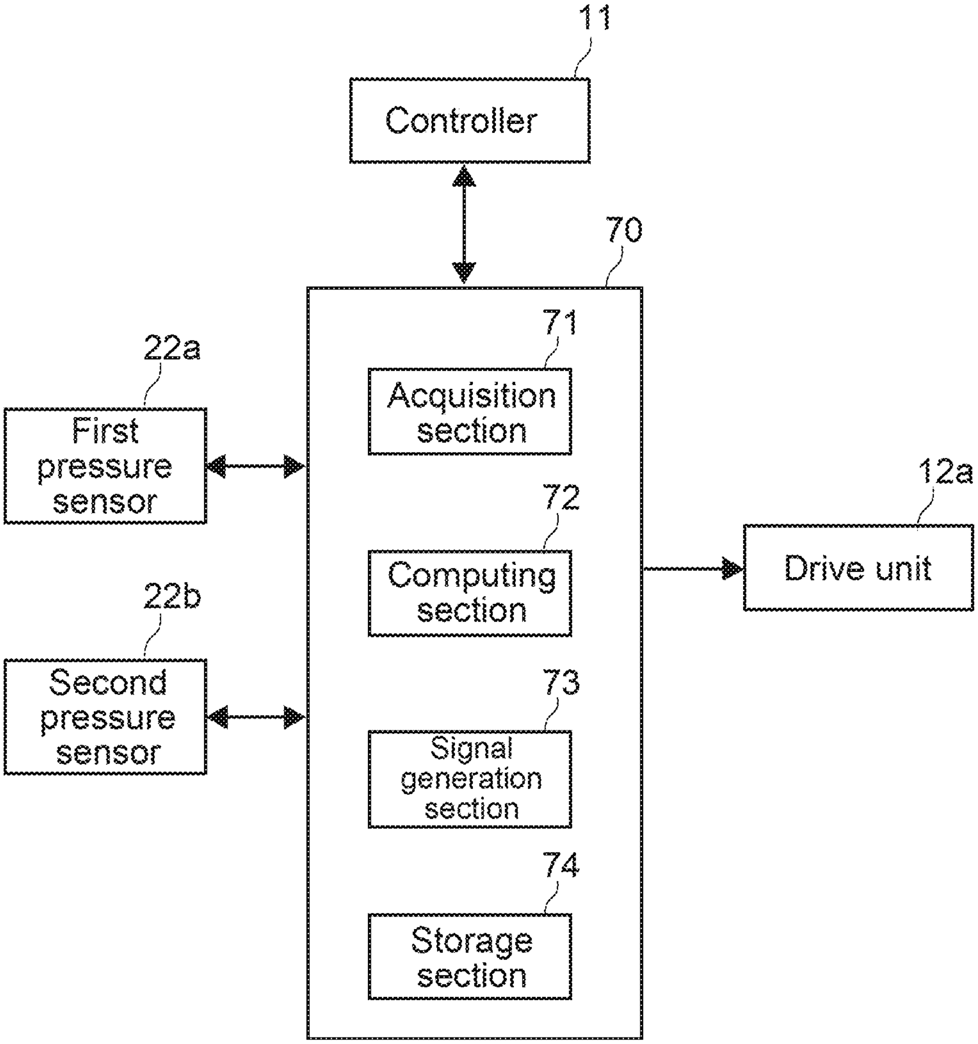
FIG. 5 is a block diagram showing a configuration of a control device in the sensor apparatus.

FIG. 5 is a block diagram showing a configuration of the control unit 70.

The control unit 70 is electrically connected to the first pressure sensor 22*a* and the second pressure sensor 22*b*, and calculates a vertical load and a shear force distribution on the basis of the pressure detection positions in the in-plane direction, which are detected by the first pressure sensor 22*a* and the second pressure sensor 22*b*.

The control unit 70 is further electrically connected to the controller 11 and outputs, on the basis of a control command from the controller 11, a hold command to a drive unit 12*a* that drives the finger portions 3*a* of the hand portion 3 on the basis of the calculated vertical load and shear force distribution.

As shown in FIG. 5, the control unit 70 includes an acquisition section 71, a computing section 72, a signal generation section 73, and a storage section 74.

The acquisition section 71 receives a pressure detection position and a pressure value thereof that are output from the first pressure sensor 22*a*, a pressure detection position and a pressure value thereof that are output from the second pressure sensor 22*b*, and a control command output from the controller 11.

Pressure information including the pressure detection positions and the pressure values thereof that are output from the first pressure sensor 22*a* and the second pressure sensor 22*b* is information regarding stress acting on the sensor apparatus 20 when the hand portion 3 (finger portions 3*a*) is holding a workpiece. The pressure information typically includes a reaction force of holding, which acts on the sensor apparatus 20, a self-weight of the workpiece, a frictional force between the sensor apparatus 20 and the workpiece, and the like.

The computing section 72 calculates the forces in the directions of the three axes, which act on the pressure detection surface of the sensor apparatus 20, that is, a load vertical to the pressure detection surface and a shear force distribution in the in-plane direction, on the basis of the pressure detection positions in the in-plane direction and the pressure values thereof, which are output from the first pressure sensor 22*a* and the second pressure sensor 22*b*.

The load vertical to the pressure detection surface is calculated by, for example, the sum of the vertical loads acquired by the respective sensing portions 28 of the first pressure sensor 22*a* and the second pressure sensor 22*b*.

On the other hand, the shear force distribution in the in-plane direction of the pressure detection surface is calculated on the basis of a difference between the pressure center position of the first pressure sensor 22*a* and the pressure center position of the second pressure sensor 22*b*, as will be described later.

The signal generation section 73 generates a hold command for causing the hand portion 3 to hold a workpiece on the basis of a control command from the controller 11. The hold command includes information regarding the holding force of the hand portion 3 with respect to the workpiece. The signal generation section 73 outputs the generated hold command to the drive unit 12*a* of the hand portion 3.

The drive unit 12*a* is an actuator that causes the finger portions 3*a* of the hand portion to move between a holding position and a non-holding position. In this embodiment, the drive unit 12*a* is, for example, a pulse motor capable of fine feed control.

The storage section 74 is typically a semiconductor memory. The storage section 74 stores a program and various parameters for performing a processing procedure of calculating the shear force distribution in the in-plane direction, on the basis of the pressure detection positions in the in-plane direction, which are output by the first pressure sensor 22*a* and the second pressure sensor 22*b*.

[Principle of Detection of Shear Force in Sensor Portion]

Hereinafter, the principle of detection of a shear force Fs in the sensor portion 21 will be described.

Figure 6:
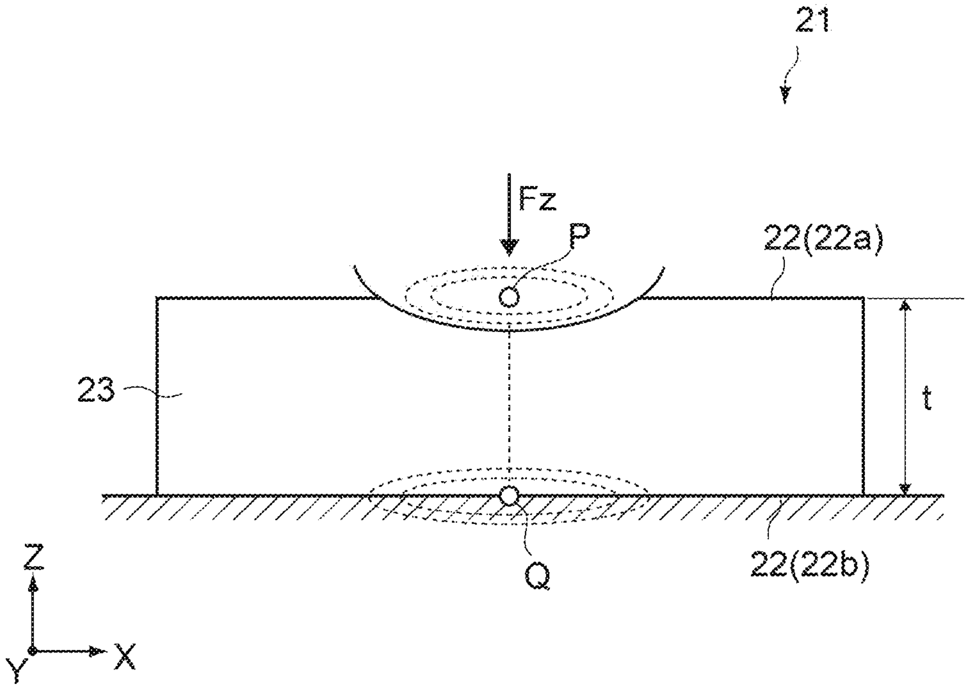
FIG. 6 is an explanatory diagram showing a state in which a load is applied to the sensor portion downwardly in a vertical direction.
Figure 7:
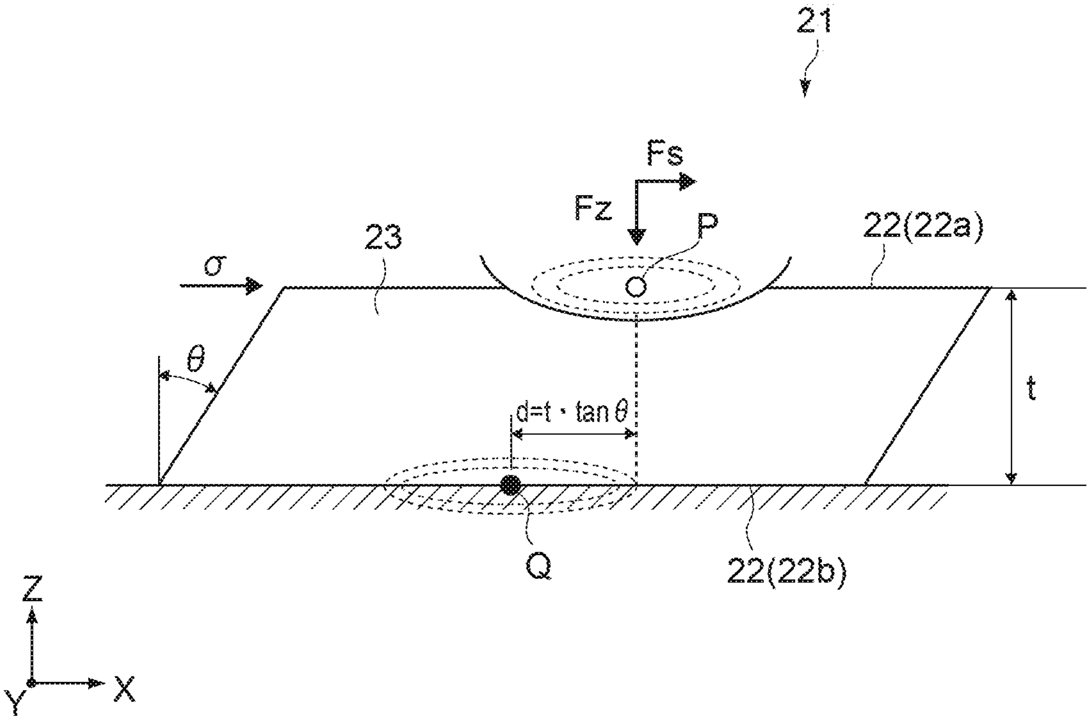
FIG. 7 is an explanatory diagram showing a state in which a shear force is applied to the sensor portion in an in-plane direction while a vertical load is being applied to the sensor portion.

FIG. 6 is a diagram showing, as a model, a state in which a load Fz is applied to the sensor portion 21 downwardly in the vertical direction. FIG. 7 is a diagram showing, as a model, a state in which a shear force Fs is applied to the sensor portion 21 in the in-plane direction while a vertical load Fz is being applied to the sensor portion 21. Note that FIGS. 6 and 7 show contour lines of detected pressures by circles of broken lines.

As shown in FIG. 6, when a load Fz is applied to the sensor portion 21 downwardly in the vertical direction, a pressure center position P in the in-plane direction, which is detected by the first pressure sensor 22*a*, coincides with a pressure center position Q in the in-plane direction, which is detected by the second pressure sensor 22*b*. Note that the pressure center position refers to a position in the in-plane direction that corresponds to a highest pressure in a detected pressure distribution.

On the other hand, as shown in FIG. 7, when a shear force Fs is applied to the sensor portion 21 in the in-plane direction while a load Fz is being applied to the sensor portion 21 downwardly in the vertical direction, the pressure center position P in the in-plane direction, which is detected by the first pressure sensor 22*a*, does not coincide with the pressure center position Q in the in-plane direction, which is detected by the second pressure sensor 22*b*.

The separation layer 23 is distorted in accordance with the shear force Fs applied in the in-plane direction. At that time, the separation layer 23 generates a shear stress θ corresponding to the shear force Fs. Here, a shear modulus of the separation layer 23 is represented by G, and the thickness of the separation layer 23 is represented by t. Further, a difference between the pressure center position P of the first pressure sensor 22*a* and the pressure center position Q of the second pressure sensor 22*b* (hereinafter, also referred to as coordinate displacement) is represented by d (=t×tan θ). In this case, the shear stress σ (shear force Fs) is represented by the following equation (1).

$$\sigma = Fs = G \times d \ \ldots \qquad (1)$$

Here, the shear modulus G of the separation layer 23 on the right side of the equation is known. Therefore, if the coordinate displacement d, which is the difference between the pressure center position P in the in-plane direction of the first pressure sensor 22*a* and the pressure center position Q in the in-plane direction of the second pressure sensor 22*b*, is calculated on the basis of the pressure center position P and the pressure center position Q, the shear stress Fs, that is, a force in the in-plane direction can be detected.

Figure 8:
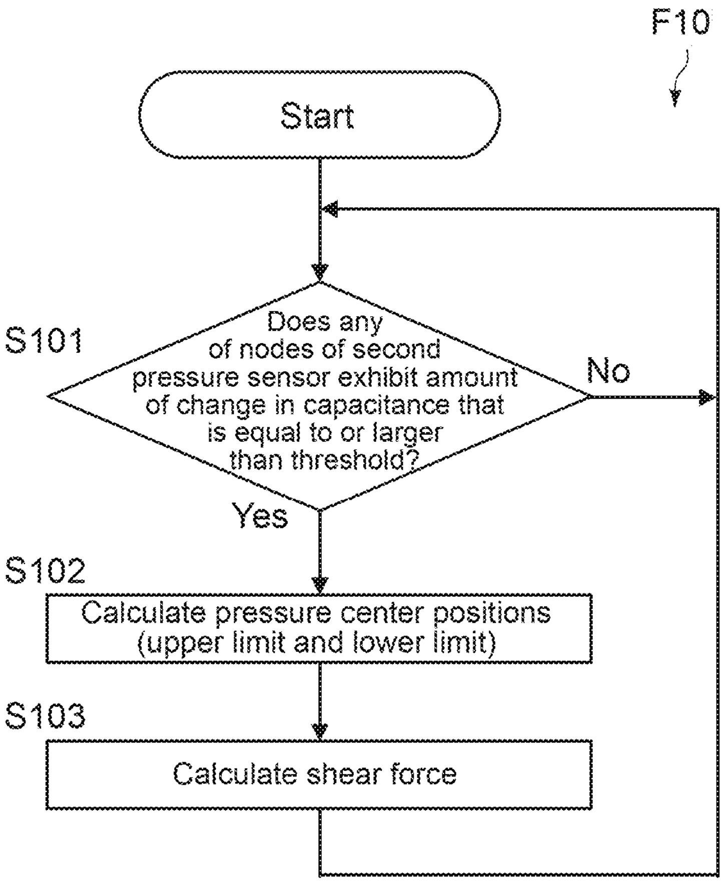
FIG. 8 is a flowchart for describing a processing procedure of calculating a shear force.

FIG. 8 is a flowchart for describing a processing procedure (F10) of calculating a shear force. This processing can be performed by, for example, the computing section 72 of the control unit 70.

When a load is applied to the sensor portion 21, it is determined whether or not there is a sensing portion 28 that exhibits an amount of change in capacitance that is equal to or larger than a threshold, among the plurality of sensing portions 28 (nodes) of the second pressure sensor 22*b*. If there is at least one sensing portion 28 that exhibits an amount of change in capacitance that is equal to or larger than a threshold (Yes in Step 101), an upper limit of a pressure center position (for example, position P) and a lower limit of the pressure center position (for example, position Q) are calculated on the basis of the outputs of the first pressure sensor 22*a* and the second pressure sensor 22*b* (Step 102). A shear force is then calculated on the basis of the coordinate displacement calculated from those pressure center positions by using the equation (1) describes above (Step 103).

[Action of Sensor Apparatus]

Incidentally, the force acting on the sensing surface of the sensor apparatus 20 is not limited to a load Fz alone or a shear force Fs alone. The load Fz and the shear force Fs may act at the same time. If the load Fz and the shear force Fs are detected using the sensor portion 21 alone, the load Fz and the shear force will not be separated from each other. This may make it difficult to detect a shear force distribution in the in-plane direction.

Figure 9:
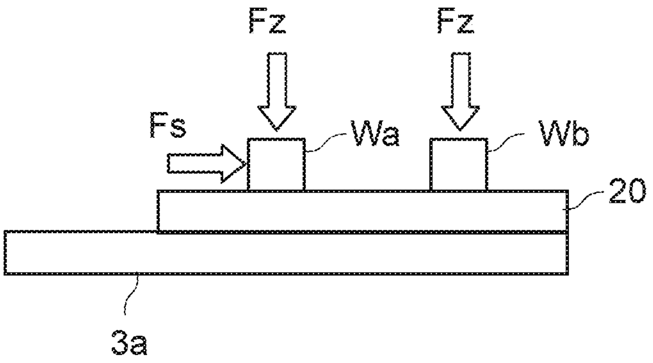
FIG. 9 is a schematic side view for describing an action of the sensor portion.

As shown in FIG. 9 as an example, it is assumed that two pushers Wa and Wb act on the sensor apparatus 20 at the same time. A load Fz is applied to each of the pushers Wa to be vertically applied to the sensor portion 21, and a shear force Fs is applied to only one pusher Wa in any direction (direction approaching the pusher Wb in the illustrated example). The separation layer 23 is deformed in the in-plane direction in response to the shear force Fs applied to the pusher Wa.

Figure 10:
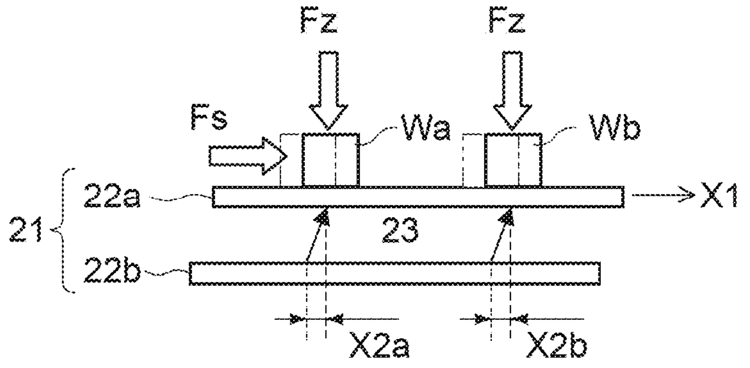
FIG. 10 is a schematic side view for describing an action of a sensor apparatus that does not include a viscoelastic body layer.

Here, if the pushers Wa and Wb directly act on the sensor portion 21 without the viscoelastic body layer 81, in response to the shear force Fs acting on the pusher Wa, the first pressure sensor 22*a* on the front side easily moves integrally with the separation layer 23 as shown in FIG. 10. In other words, the first pressure sensor 22*a* moves in the in-plane direction relative to the second pressure sensor 22*b* by a predetermined amount (X1 in the illustrated example) in response to the deformation of the separation layer 23.

As a result, a coordinate displacement X2*a* (corresponding to d described above) of a shear region (located directly under the pusher Wa) and a coordinate displacement X2*b* (corresponding to d described above) of a non-shear region (located directly under the pusher Wb) are equal to each other. In other words, despite the fact that only the vertical load Fs acts on the pusher Wb, there is a possibility that an action of the shear force Fs on the pusher Wb is erroneously detected (see Step 103 in FIG. 7). As described above, it is difficult to divide the pressing forces respectively applied by the pushers Wa and Wb only using the sensor portion 21. This results in being very difficult to detect a shear force distribution in the in-plane direction.

Figure 11:
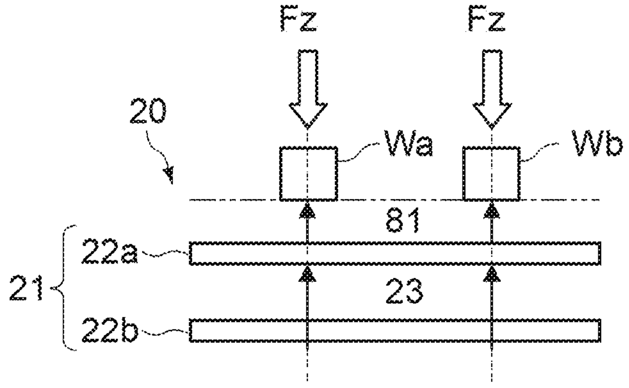
FIG. 11 is a schematic side view for describing an action of a sensor apparatus that includes a viscoelastic body layer.
Figure 12:
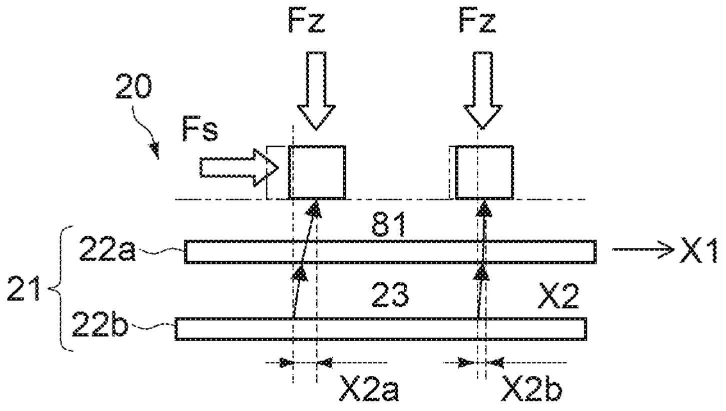
FIG. 12 is a schematic side view for describing an action of a sensor apparatus that includes a viscoelastic body layer.

On the other hand, the sensor apparatus 20 of this embodiment includes the viscoelastic body layer 81 on the first pressure sensor 22*a*, and thus the movement of the first pressure sensor 22*a* due to the shear force Fs acting on the pusher Wa can be made smaller. FIGS. 11 and 12 are schematic diagrams each showing the relationship between the sensor apparatus 20 and the pushers Wa and Wb. FIG. 11 shows a state before the shear force Fs is applied to the pusher Wa, and FIG. 12 shows a state after the shear force Fs is applied to the pusher Wa.

As shown in FIG. 11, the pushers Wa and Wb face the first pressure sensor 22*a* via the viscoelastic body layer 81. When the shear force Fs is applied to the pusher Wa in this state as shown in FIG. 12, the viscoelastic body layer 81 and the separation layer 23 are each deformed in the in-plane direction. At that time, the first pressure sensor 22*a* is deformed by an amount corresponding to the amount of deformation of the viscoelastic body layer 81. The first pressure sensor 22*a* is locally deformed, and the deformation of the viscoelastic body 81 in a region immediately below the pusher Wb is suppressed. Further, since the first pressure sensor 22*a* is deformed along with the deformation of the viscoelastic body layer 81, the displacement X1 in the in-plane direction is smaller than that in the case where the viscoelastic body layer 81 is not provided (FIG. 9).

As a result, the deformation of the separation layer 23 in the in-plane direction is also large in a detection region for the pusher Wa and is also small in a detection region for the pusher Wb, so that the coordinate displacement X2*b* of the non-shear region is made smaller than the coordinate displacement X2*a* of the shear region. This makes it possible to separate the pressing forces applied by the pushers Wa and Wb from each other, and thus detect an in-plane distribution of the shear force acting on the sensor portion 21.

Figure 13:
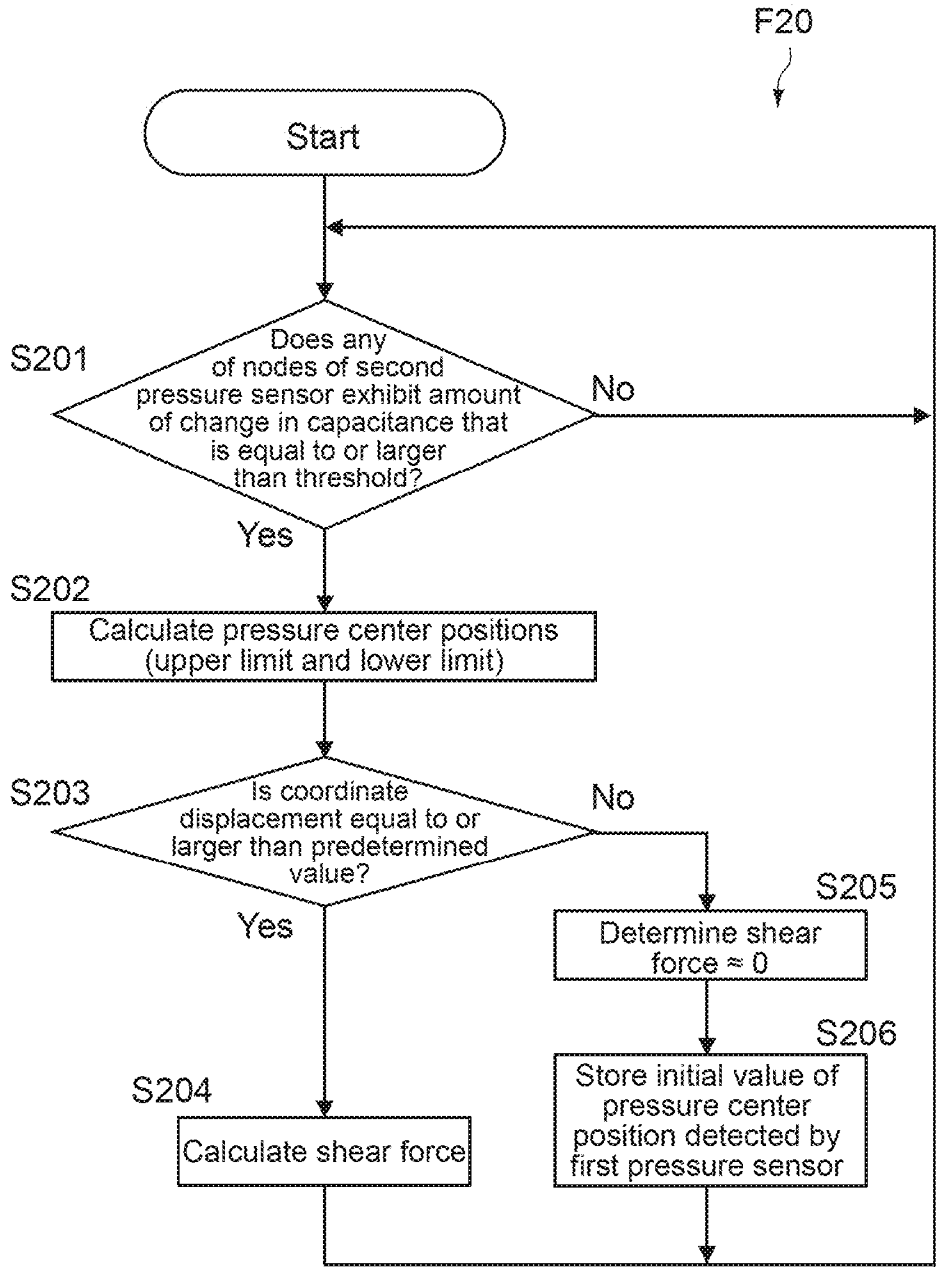
FIG. 13 is another flowchart showing an example of a processing procedure performed by the control device in the sensor apparatus.

FIG. 13 is a flowchart showing an example of a processing procedure (F20) performed by the computing section 72 of the control unit 70 in the sensor apparatus 20 of this embodiment.

When a load is applied to the sensor apparatus 20, the computing section 72 determines whether or not there is a sensing portion 28 that exhibits an amount of change in capacitance that is equal to or larger than a threshold, among the plurality of sensing portions 28 (nodes) of the second pressure sensor 22*b* on the lower layer side. If there is at least one sensing portion 28 that exhibits an amount of change in capacitance that is equal to or larger than a threshold (Yes in Step 201), the computing section 72 calculates an upper limit of a pressure center position (for example, position P) and a lower limit of the pressure center position (for example, position Q) on the basis of the outputs of the first pressure sensor 22*a* and the second pressure sensor 22*b* (Step 202). The processing so far is similar to the processing procedure described with reference to FIG. 8.

Subsequently, the computing section 72 determines whether or not the coordinate displacement of the pressing force is equal to or larger than a predetermined value (Step 203). As described above, the coordinate displacement corresponds to the difference d between the pressure center position P of the first pressure sensor 22*a* and the pressure center position Q of the second pressure sensor 22*b*. When the coordinate displacement is equal to or larger than a predetermined value (Yes in Step 203), the computing section 72 determines that a significant shear force (or slip) is caused on the sensing surface, and calculates a shear force from the equation (1) described above (Step 204).

On the other hand, when the coordinate displacement is less than the predetermined value (No in Step 203), the computing section 72 determines that no significant shear force is caused on the sensing surface (Step 205). In this case, the computing section 72 stores an initial value of the pressure center position P of the first pressure sensor 22*a* on the upper layer side (Step 206). By the above procedure repeatedly performed in a predetermined cycle, a temporal change in the pressing force applied to the sensor apparatus 20 is detected.

The predetermined value in Step 203 can be discretionally set according to thicknesses or areas of the separation layer 23 and the viscoelastic body layer 81, a value of physical properties such as viscoelasticity, ease of deformation of the first pressure sensor 22*a*, an arrangement pitch of the sensing portions 28 in each of the pressure sensors 22*a* and 22*b*, or the like. The predetermined value described above is favorably set to a value with which it can be determined that a shear force is not substantially caused at a detection point of the pusher Wb due to a shear force applied by the pusher Wa, for example.

The computing section 72 calculates a suitable holding force with respect to the workpiece on the basis of the calculated value of the shear force calculated in Step 204, or the initial value of the pressure center position P stored in Step 206. The signal generation section 73 generates a hold command for controlling the drive unit 12*a* of the hand portion 3 on the basis of the calculation result of the computing section 72.

[Control of Robot Apparatus]

Figure 14:
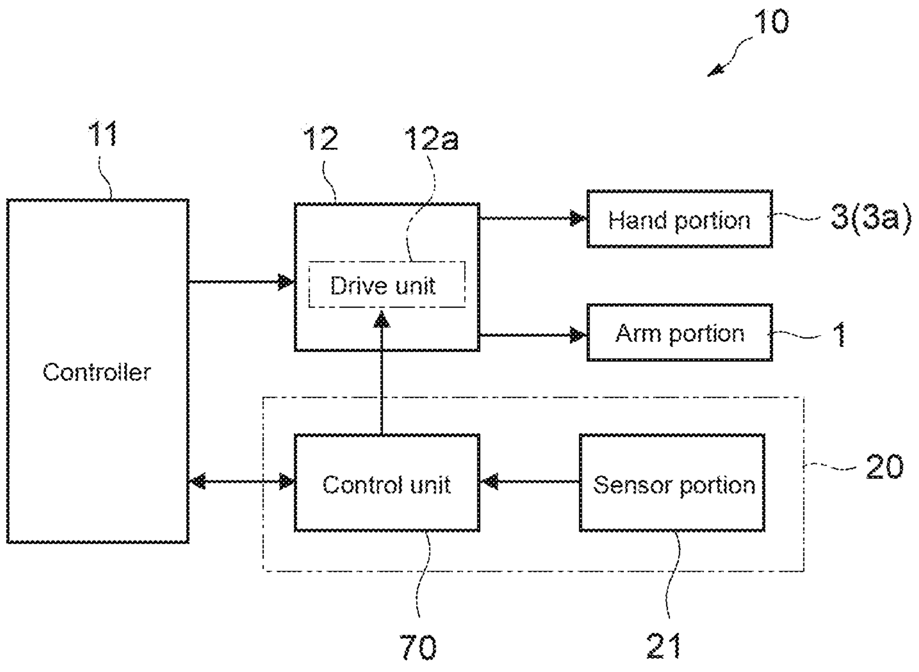
FIG. 14 is a block diagram showing an example of a control system of the robot apparatus.

FIG. 14 is a block diagram showing an example of a control system of the robot apparatus 10. The robot apparatus 10 includes the controller 11 and a drive section 12 that drives the arm portion 1, the hand portion 3, and the like. The drive section 12 includes the drive unit 12*a* that drives the finger portions 3*a*. The controller 11 is configured to be capable of executing a control program for operating the robot apparatus 10 on the basis of input signals from various sensors.

The sensor apparatus 20 constitutes one of the various sensors described above, and is attached to a holding surface for a target object in the hand portion 3. On the basis of a control command from the controller 11, the sensor apparatus 20 outputs a hold command for holding a workpiece to the drive unit 12*a*, which drives the finger portions 3*a* of the hand portion 3. The sensor apparatus 20 detects a pressing force (pressure distribution, holding force (vertical load), or shear force) acting on the sensing surface in the sensor portion 21, calculates a value of the above-mentioned pressing force in the control unit 70, and inputs the calculated value to the controller 11. The controller 11 generates a drive signal for controlling the positions of the arm portion 1 and the hand portion 3 (finger portions 3*a*), and outputs the drive signal to the drive section 12. The drive section 12 is typically an actuator such as an electric motor or a fluid pressure cylinder, and drives the arm portion 1, the hand portion 3, and the like on the basis of the drive signal from the controller 11.

As described above, in this embodiment, the hold control of the hand portion 3 is configured to be performed in the control unit 70 of the sensor apparatus 20. The present technology is not limited to the above, and the controller 11 may directly output a hold command to the drive unit 12*a* to perform the hold control of the hand portion 3. In this case, the control unit 70 of the sensor apparatus 20 performs only the functions of calculating a pressure acting on the sensor portion 21 and of outputting the calculated pressure to the controller 11.

Figure 15:
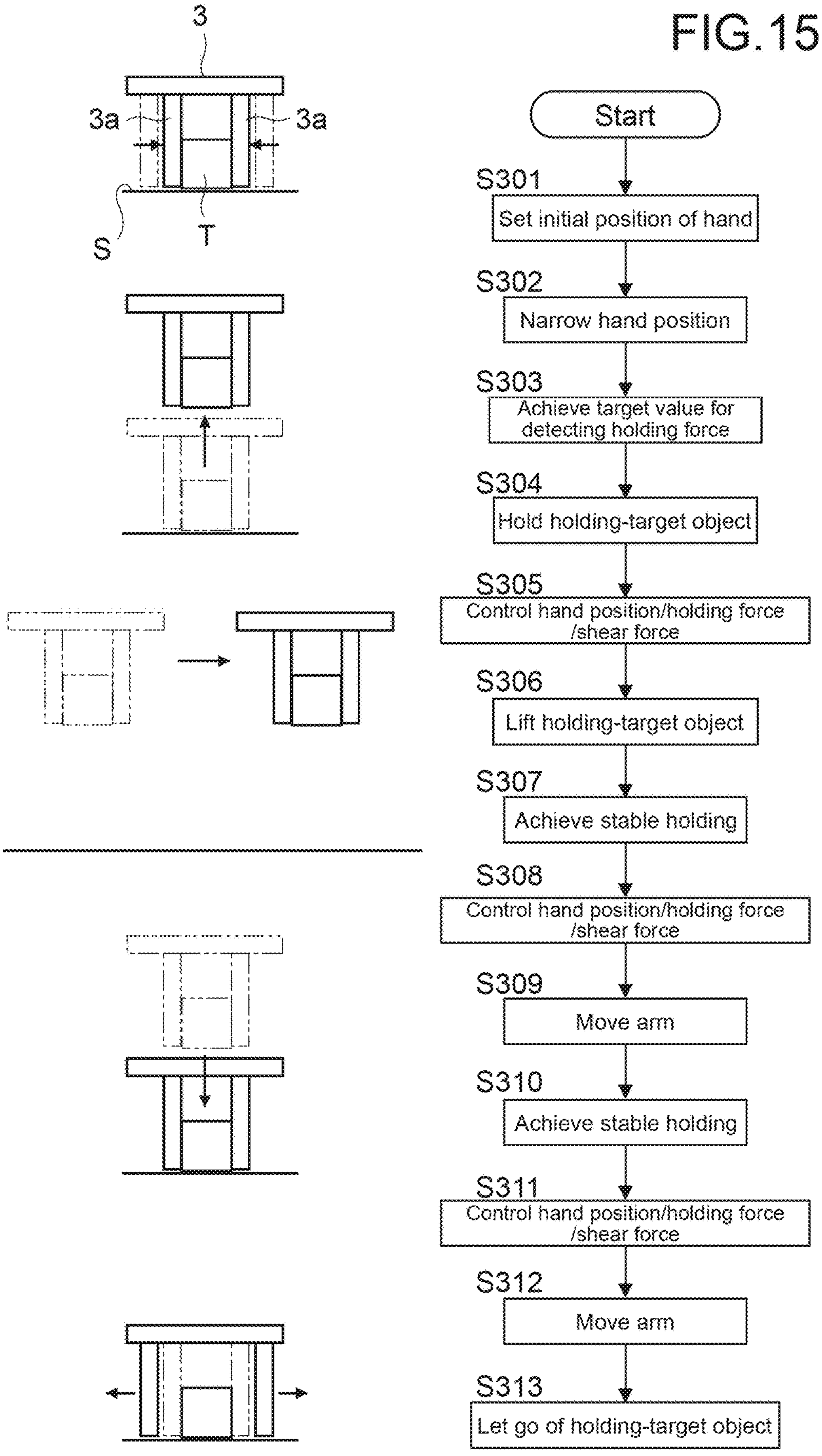
FIG. 15 is a diagram for describing a processing procedure performed by a controller of the robot apparatus.

As shown in FIG. 15, an operation example of transporting a workpiece T, which is a target object placed on a placing surface S, to another location, and a processing procedure performed in the controller 11 and the control unit 70 will be described as an example.

[Operation of Holding Workpiece]

After setting an initial position, which is a position to hold a workpiece T, the controller 11 outputs a control command for narrowing a hand position (facing distance between finger portions 3*a*) to the control unit 70 (Steps 301 and 302).

When the finger portions 3*a* come into contact with the workpiece T and when a target value for detecting a holding force (typically, pressing force acting on the sensor apparatus 20 when the finger portions 3*a* come into contact with workpiece T) is obtained, the control unit 70 performs control such that the workpiece T is held by the hand portion 3 (Steps 303 and 304).

At that time, the control unit 70 adjusts the position of the hand portion 3 (a posture of the hand portion 3 or the facing distance between the finger portions 3*a*) to control the holding force with respect to the workpiece T or a shear force acting on the sensor apparatus 20 (Step 305).

The controller 11 then controls the holding force or the like of the hand portion 3 so as to lift the workpiece T and stably hold the target object (Steps 306 and 307).

Note that the holding force is controlled using the distance between the finger portions 3*a* of the hand portion 3 such that a reaction force (stress) caused by the holding operation takes a target value. The control method is not particularly limited, and typically, PID control is employed. A reaction force of the holding operation is calculated on the basis of the sum of the outputs (pressure values) of the sensing portions 28 constituting the pressure sensor 22 of the sensor apparatus 20. The target value is discretionally set according to the type, size, shape, and the like of the workpiece T.

The feed accuracy of the drive unit 12*a* is not particularly limited, but for example, it is favorable that the drive unit 12*a* be configured by an actuator capable of driving the finger portions 3*a* at a minimum feed rate of less than 100 μm. Further, in order to highly accurately control the drive unit 12*a* with such fine feed accuracy, it is favorable that the control unit 70 be configured to be capable of generating a hold command for the drive unit 12*a* in a position control cycle of 20 Hz or more, for example.

[Operation of Moving Workpiece]

Subsequently, the control unit 70 holds the hand portion 3 and further adjusts the holding force as will be described later (Step 308). After that, the controller 11 performs control such that the arm portion 1 is moved to a destination (Step 309). At that time, a shear force or the like acting on the hand portion 3 may change due to the influence of inertia or the like caused by the movement of the arm portion 1. The controller 11 or the control unit 70 adjusts the posture or the holding force of the hand portion 3 to perform control such that the stable holding of the workpiece T is maintained (Step 310).

[Operation of Letting Go of Workpiece]

When the workpiece T reaches a target position, the controller 11 performs control such that the movement of the arm portion 1 is stopped. In this case as well, when the shear force or the like acting on the hand portion 3 changes due to the influence of inertia or the like, the hand portion 3 is controlled such that the stable holding of the workpiece T is maintained, and then an operation of lowering the arm is performed (Steps 311 and 312). When the workpiece T is placed on the placing surface S, the controller 11 stops the operation of lowering the arm portion 1. The control unit 70 outputs a hold release command for releasing the holding operation by the hand portion 3 to the drive unit 12*a* on the basis of the control command from the controller 11, and performs control such that the holding force to the workpiece T is released (Step 313).

Figure 16:
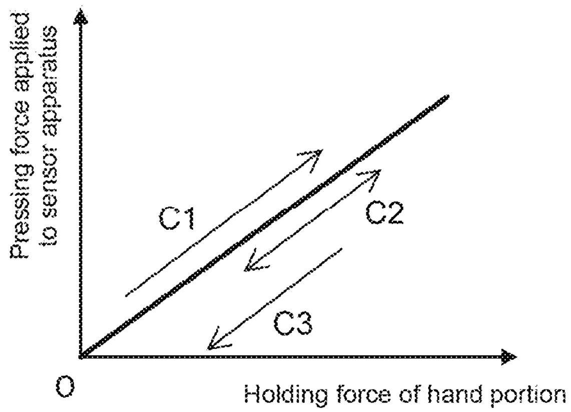
FIG. 16 is a diagram showing a relationship between a pressing force applied to the sensor apparatus and a holding force of a hand portion.

The pressing force applied to the sensor apparatus 20 and the holding force of the hand portion 3 have a linear correlation as shown in FIG. 16, and the pressing force increases in proportion to the holding force. An adjustment range of the holding force for the workpiece T is different between the operation of holding the workpiece T, the operation of moving the workpiece T, and the operation of letting go of the workpiece T. Typically, the holding force is adjusted in the range of the arrow C1 during the holding operation, in the range of the arrow C2 during the moving operation, and in the range of the arrow C3 during the operation of letting go.

Figure 17:
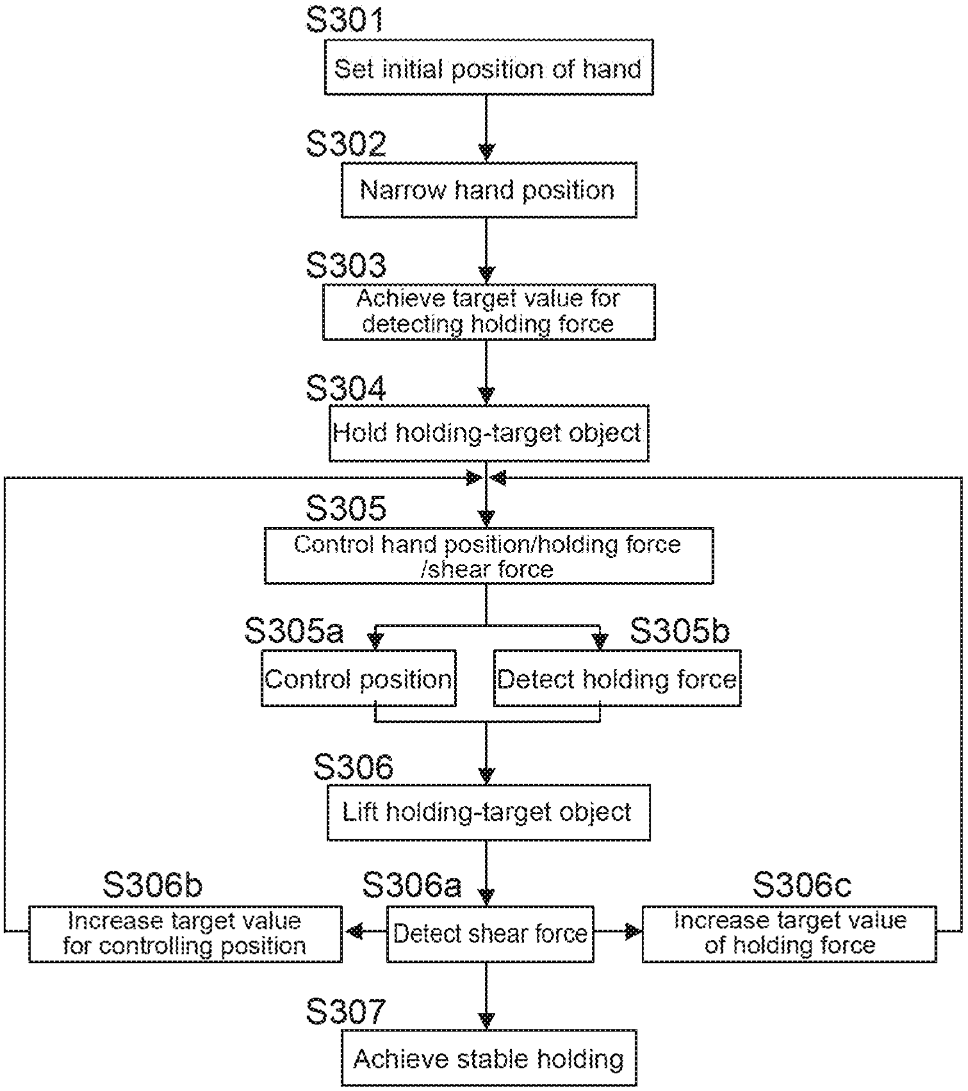
FIG. 17 is a flowchart showing a processing procedure of an operation of holding a target object by the robot apparatus.

FIG. 17 is a flowchart showing the details of the processing procedure of the holding operation performed in the control unit 70.

Step 305 includes Step 305*a* of controlling the hand position and Step 305*b* of detecting the holding force. For example, the holding force is determined on the basis of the vertical load Fz and the in-plane distribution of the shear force Fs, which are output from the sensor apparatus 20, and the hand portion 3 is controlled such that the holding force takes a target value.

Further, Step 306 includes Step 306*a* of detecting the shear force Fs and Steps 306*b* and 306*c* of resetting a target value of a position and posture of the hand portion or a target value of the holding force so as to stabilize the holding operation on the basis of the shear force Fs.

Figure 18:
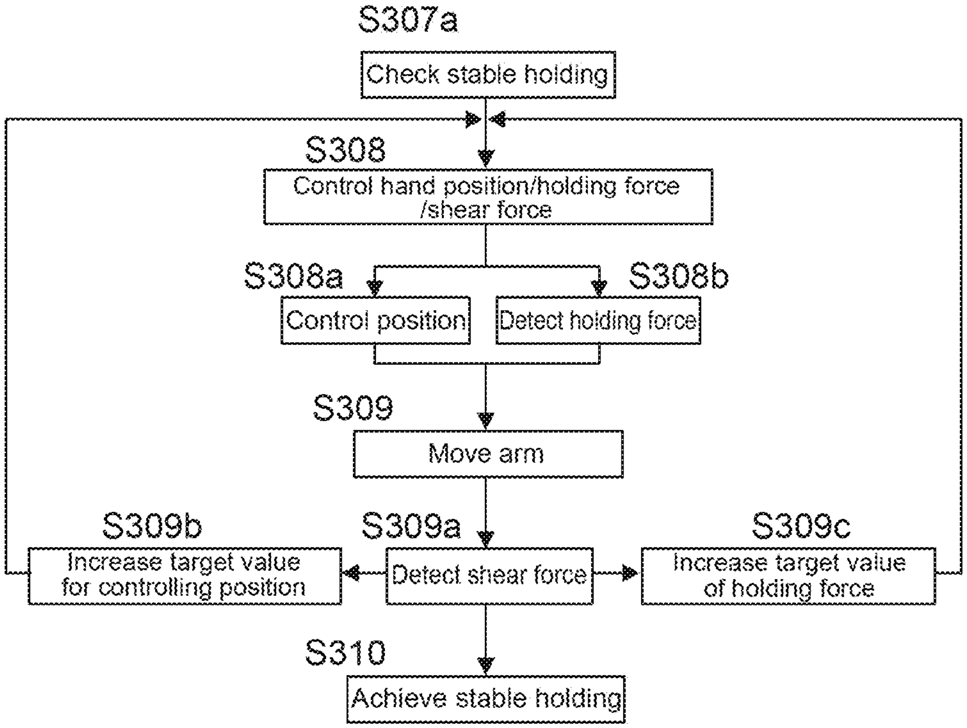
FIG. 18 is a flowchart showing the processing procedure of the operation of holding a target object by the robot apparatus.

FIG. 18 is a flowchart showing the details of the processing procedure of the operation of moving the workpiece T.

The step of checking whether or not the workpiece T is stably held is included as Step 307*a*. Step 308 includes Step 308*a* of controlling the hand position and Step 308*b* of detecting the holding force.

Further, Step 309 includes Step 309*a* of detecting the shear force Fs and Steps 309*b* and 309*c* of resetting a target value of a position and posture of the hand portion or a target value of the holding force so as to stabilize the holding operation on the basis of the shear force Fs.

Figure 19:
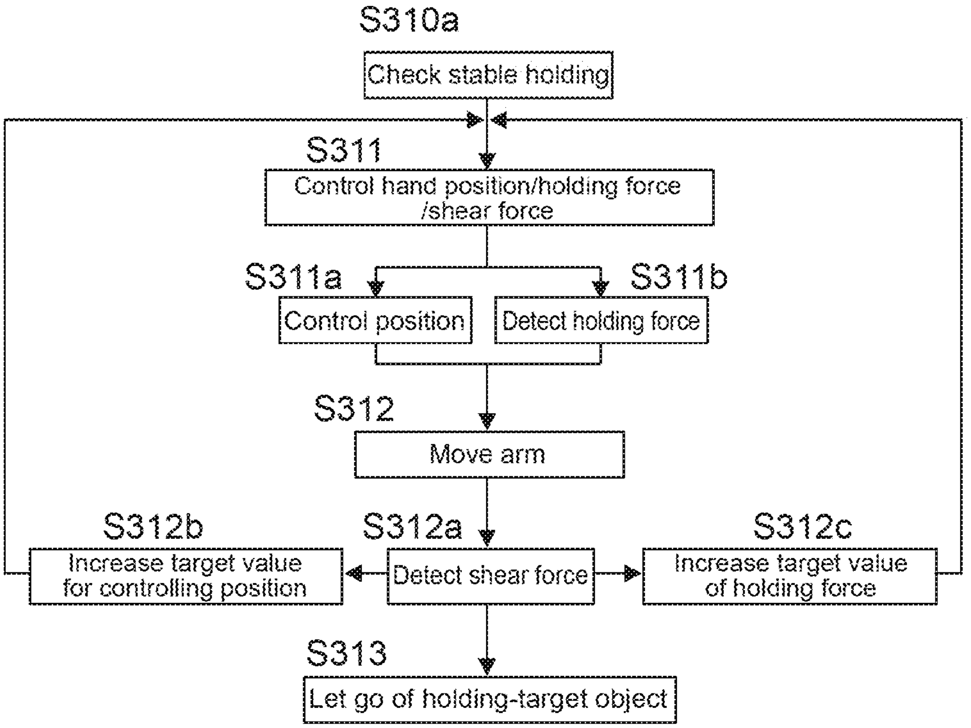
FIG. 19 is a flowchart showing the processing procedure of the operation of holding a target object by the robot apparatus.

FIG. 19 is a flowchart showing the details of the processing procedure of the operation of letting go of the workpiece T.

The step of checking whether or not the workpiece T is stably held is included as Step 310*a*. Step 311 includes Step 311*a* of controlling the hand position and Step 311*b* of detecting the holding force.

Further, Step 312 includes Step 312*a* of detecting the shear force Fs and Steps 312*b* and 312*c* of resetting a target value of a position and posture of the hand portion or a target value of the holding force so as to stabilize the holding operation on the basis of the shear force Fs.

Figure 20:
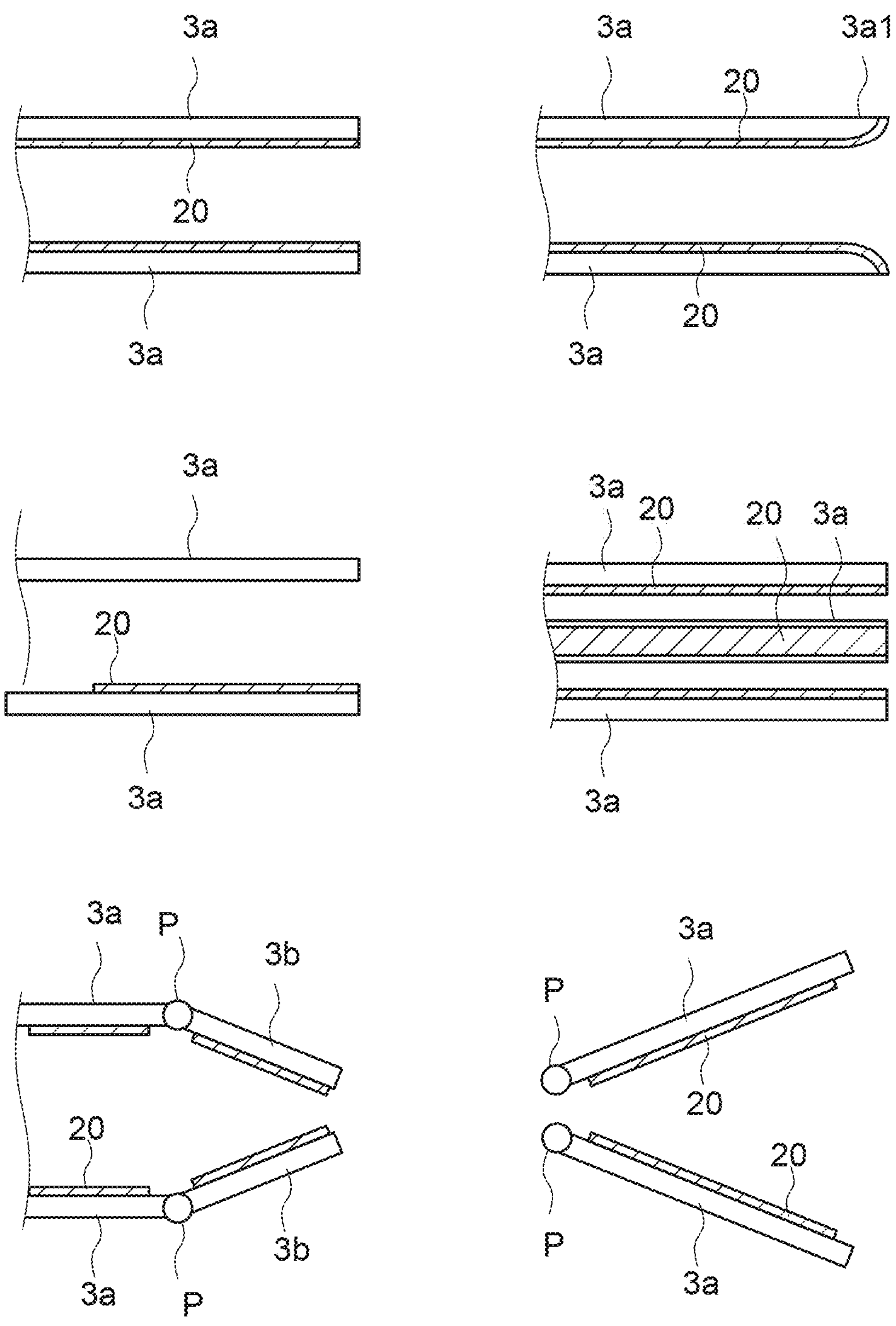
FIG. 20 is a side view of a main part, showing various configuration examples of the hand portion.

FIG. 20 shows a side view of a main part, showing various configuration examples of the hand portion 3. In the figure, a region indicated by hatching represents the sensor apparatus 20.

FIG. 20 shows, on the upper left, a two-finger parallel plate gripper, in which the sensor apparatus 20 is disposed on the inner surface of each finger portion 3*a*.

FIG. 20 also shows, on the upper right, a two-finger parallel plate gripper, which differs in that a distal end 3*a*1 of each finger portion 3*a* has a curved shape. The sensor apparatus 20 disposed on the inner surface of each finger portion 3*a* is disposed so as to cover the distal end 3*a*1 of the finger portion 3*a*, so that not only the holding force but also a contact force with the distal end 3*a*1 can be detected.

FIG. 20 also shows, on the left in the middle part, a two-finger parallel plate gripper, which is an example in which the sensor apparatus 20 is disposed only on one finger portion 3*a*.

FIG. 20 shows, on the right in the middle part, a three-finger gripper, in which the sensor apparatus 20 is disposed on the inner surface of each finger portion 3*a*.

FIG. 20 shows, on the lower left, a two-finger gripper, which is an example in which a fingertip 3*b* is connected to the distal end of each finger portion 3*a* via a pivotable portion P. In this case, the sensor apparatus 20 is disposed on the inner surface of each of the finger portion 3*a* and the fingertip 3*b*.

FIG. 20 shows, on the lower right, a two-finger rotary gripper that is rotatable at a pivotable portion P, which is an example in which the sensor apparatus 20 is disposed on the inner surface of each finger portion 3*a*.

Figure 21:
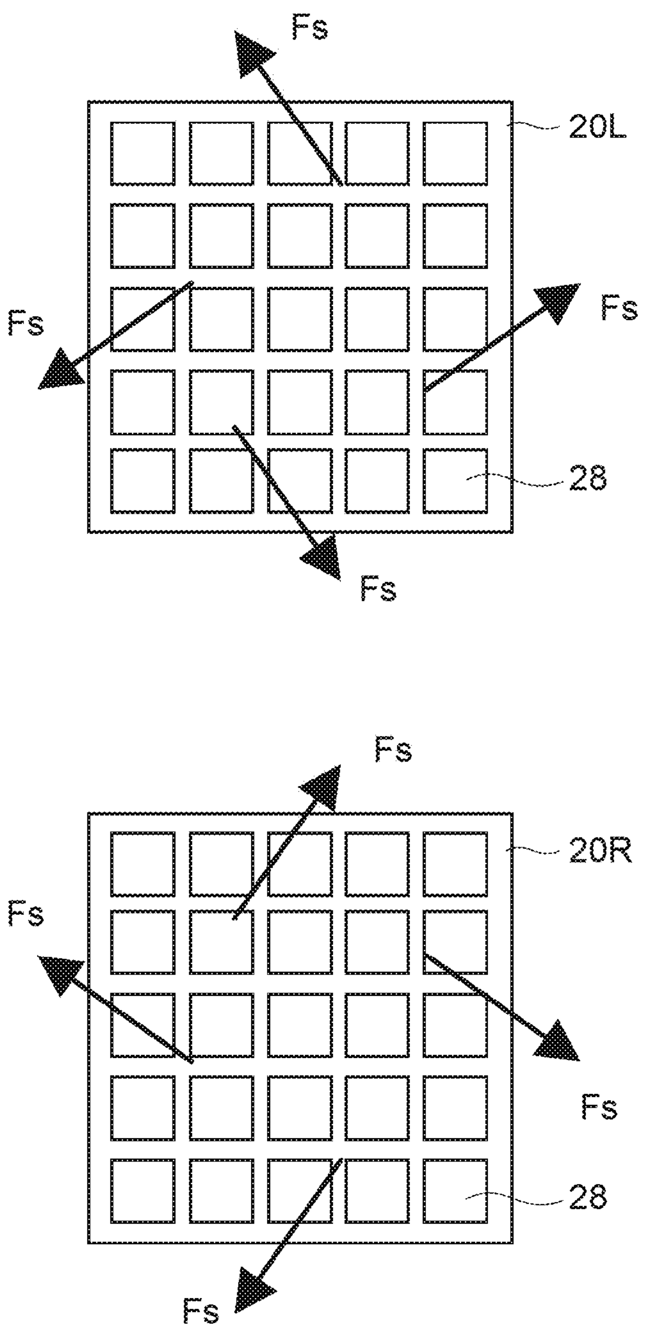
FIG. 21 is a diagram showing an example of applying the present technology to a two-finger parallel plate gripper.

FIG. 21 shows an example of the in-plane distribution of the shear force Fs, which is detected by the sensor apparatus 20 disposed on the inner surface of each finger portion 3*a*, in a two-finger parallel plate gripper. Here, it is assumed that a sensor apparatus disposed on a finger portion 3*a* on one side (for example, left side) is a sensor apparatus 20L, and a sensor apparatus disposed on a finger portion 3*a* on another side (for example, right side) is a sensor apparatus 20R.

When a slip occurs to rotate a target object held between the finger portions 3*a* about an axis parallel to the holding direction, each of the sensor apparatuses 20L and 20R detects the in-plane distribution of the shear force Fs as shown in the figure. In this case, the in-plane distribution of the shear force Fs is detected symmetrically in each of the sensor apparatuses 20L and 20R. Therefore, the in-plane distribution of the shear force Fs acting on the finger portion 3*a* can be detected with high accuracy.

[Regarding Control of Holding Force]

In a robot hand that holds an object (workpiece) in a factory, a shop, or the like, there is a problem that when an indefinite-shaped object, a soft object, a small object, a slippy object, or the like is held, the object will be dropped if the robot hand does not hold the object with an appropriate force.

In order to solve such a problem, there has been conventionally known a method of controlling the holding force by monitoring a state of a current of a motor constituting a holding mechanism. However, a motor capable of controlling a precise holding force is a dedicated product equipped with PWM control or a torque sensor, which is very expensive.

Further, there is known a method in which a sensor capable of detecting a pressure is mounted on a holding surface or a fingertip of the hand, and an optimal holding force is provided by feeding back the sensor output thereof. However, in the conventional pressure sensor of this type, detection of a pressure at a point is main stream, and a detection region does not extend in the two-dimensional planar direction. This leads to a problem that a dead-zone region is generated during holding.

On the other hand, according to the robot apparatus 10 of this embodiment, the sensor apparatus 20 capable of detecting a pressure distribution is disposed on the finger portion 3*a* of the hand portion 3, and a holding force is controlled on the basis of a detection result, which makes it possible to reduce the dead-zone region as much as possible and to hold the workpiece T with a suitable holding force. This holding force can be achieved by adjusting the distance between the finger portions 3*a*.

Further, according to this embodiment, the sensor apparatus 20 is configured to be capable of detecting not only the pressure distribution but also a shear force distribution. Thus, even if a slip occurs between the hand portion 3 and the workpiece held by the hand portion 3 due to a self-weight of the workpiece or an inertial force acting on the workpiece, the slip can be reliably detected, and thus the holding force can be increased until the slip stops, thereby preventing the workpiece from falling.

(Drift of Sensor Output)

On the other hand, in order to detect the pressure distribution and the shear force distribution, the sensor apparatus 20 of this embodiment has a structure using a large number of elastic layers that are elastically deformable, such as the separation layer 23, the viscoelastic layer 81, and the deformation layer 27. If a constituent material exhibits a viscoelastic behavior, the sensor apparatus 20 including the elastic layers in its structure may have a reduced stress when it is retained under a constant strain. In other words, a stress relaxation phenomenon may occur, in which an actual holding force decreases even if pressure information detected by the sensor is constant. This phenomenon is thought to be due to the physical behavior in which a material does not immediately reach equilibrium and deformation proceeds over time due to viscoelasticity. The inventors of the present technology have also confirmed that the decrease in pressing force gradually becomes larger as the duration of the holding operation becomes longer. Therefore, even if a workpiece is held with a target holding force, it may be difficult to stably keep holding the workpiece with a constant holding force, depending on the holding force and the duration of the holding operation.

In order to suppress the drift of the sensor output that causes the decrease in actual holding force due to the stress relaxation phenomenon as described above, the control device 70 of this embodiment is configured to be capable of correcting the holding force on the basis of the output of the sensor portion 21 and the duration of the operation of holding the workpiece.

Figure 22:
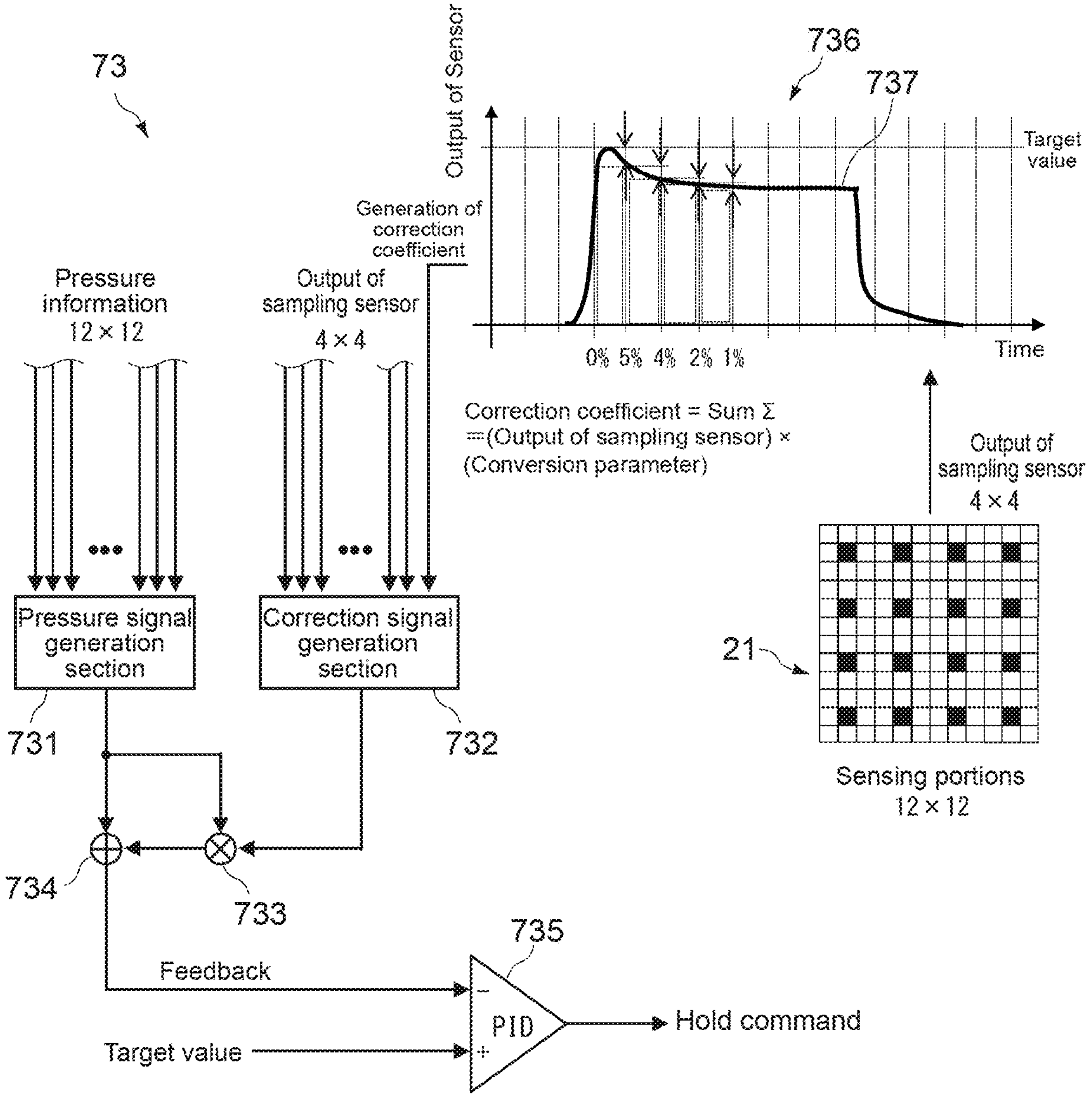
FIG. 22 is a block diagram showing a configuration of a signal generation section in the control device.

FIG. 22 is a block diagram showing a configuration of the signal generation section 73 in the control device 70. The signal generation section 73 generates a hold command supplied to the drive unit 12*a* that drives the finger portions 3*a* of the hand portion 3. As shown in the figure, the signal control section 72 includes a pressure signal generation section 731, a correction signal generation section 732, a correction coefficient generation section 736, a multiplier 733, an adder 734, a PID controller 735, and a correction coefficient generation section 736.

The pressure signal generation section 731 calculates a pressure signal including information regarding a pressure acting on the sensor apparatus 20 from the total value of the outputs (pressure values) of the plurality of sensing portions 28 two-dimensionally arranged and constituting the sensor portion 21. In this example, the number of sensing portions 28 is 144 in total with 12×12. The sensing portions 28 may be the sensing portions 28 of the first pressure sensor 22*a*, the sensing portions 28 of the second pressure sensor 22*b*, or the sensing portions 28 of both the first pressure sensor 22*a* and the second pressure sensor 22*b*.

The correction signal generation section 732 generates a correction signal on the basis of the output of a plurality of any sensing portions 28 (hereinafter, also referred to as sampling sensors) among the 12×12 sensing portions 28, and a correction coefficient generated by the correction coefficient generation section 736 to be described later. The output of the sampling sensors is a representative value of a sampling sensor group of each block, for example, when all of the sensing portions two-dimensionally arranged is divided into 3×3 blocks each including 16 (4×4) regions. The representative value is, for example, an average value of the outputs of the sampling sensor group of each block, but the present technology is not limited thereto. The sum of the outputs of the sampling sensor groups, a maximum value of the outputs of the sampling sensor groups, the output of a sensing portion located at the center of each block, and the like may be adopted.

The correction signal generated by the correction signal generation section 732 is multiplied by the pressure signal in the multiplier 733, and then added to the pressure signal in the adder 734, so that a feedback signal to be input to one input terminal of the PID controller 735 is generated.

The PID controller 735 compares the feedback signal with a target value signal to be input to the other input terminal, and generates a hold command such that the feedback signal takes the target value. The generated hold command is output to the drive unit 12*a*, and thus the holding force of the hand portion 3 is controlled.

The correction coefficient generation section 736 samples a drift curve 737 regarding a temporal change of the sensor output as shown in FIG. 22 at regular time intervals. Each sampling value is a representative value of the sensor output at each time. In this case, the sampling value is, for example, an instantaneous value at the start of sampling. The correction coefficient generation section 736 acquires a difference from the target value of the sensor output at each sampling time and generates, as a correction coefficient, a value obtained by multiplying the output of the sampling sensor by a conversion parameter whose value gradually decreases at each sampling time.

Here, the drift curve 737 indicates drift characteristics of the output of the sensor portion 21 with respect to a constant load acquired in advance, and is stored in the storage section 74 (see FIG. 5). The drift curve 737 is a temporal change of a value obtained by converting, as a sensor output, the actual holding force that is reduced by the above-mentioned stress relaxation phenomenon of the elastic layers. At the start of holding, a sensor output corresponding to the target value is obtained, but the output gradually decreases with the lapse of the holding time. A value corresponding to the reduced output is multiplied by a conversion parameter assigned to each sampling time, and the correction coefficient is sequentially updated in synchronization with the sampling time. The conversion parameter is appropriately set in accordance with, for example, creep characteristics peculiar to the material of the elastic layers constituting the sensor apparatus. Typically, the conversion parameter is any number equal to or larger than 0 and less than 1, and in this example, set within 0 to 5% of the target sensor output. Further, the conversion parameter may be set in accordance with the layer structure of the sensor apparatus, the form of the elastic layer, and the like as in the embodiments to be described later.

As described above, the signal generation section 73 generates the hold command on the basis of the addition value of the pressure value, which is calculated on the basis of the sum of the outputs of the plurality of sensing portions 28, and the correction value, which is obtained by multiplying the pressure value by the correction coefficient. Since the correction coefficient thus generated is sequentially updated at the sampling intervals as described above, the pressure value as a feedback signal to be input to the PID controller 735 is also gradually decreased. As a result, since a difference from the target value increases, a hold command that increases the holding force so as to cancel the difference is output from the PID controller 735. Note that at the start of the holding operation, the drift characteristics reach the target value of the sensor output, and thus the correction coefficient is zero.

Figure 23:
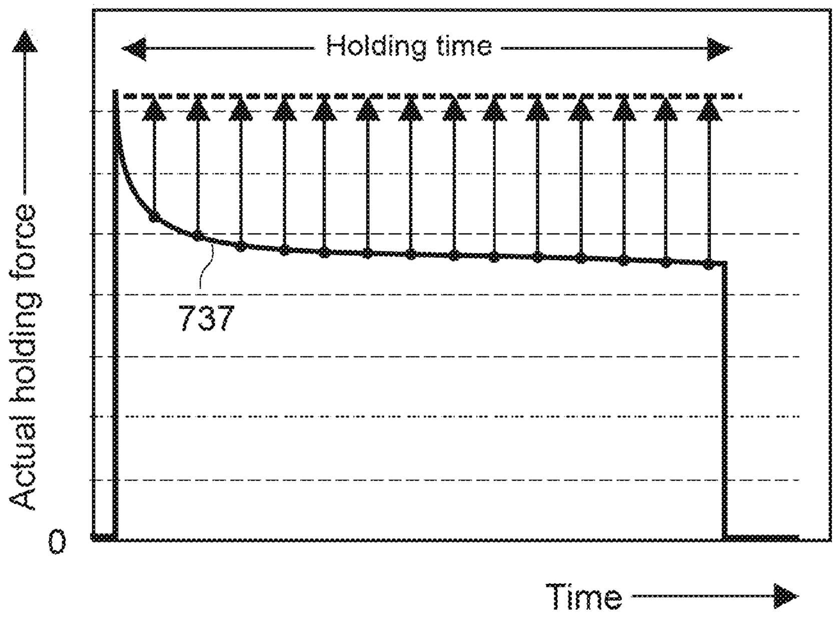
FIG. 23 is a diagram showing an example of a temporal change of a hold command output from the signal generation section.

FIG. 23 is a diagram showing an example of the temporal change of the hold command output from the signal generation section 73. As shown in the figure, the signal generation section 73 is configured to correct the holding force on the basis of the output of the sensor portion 21 and the duration of the holding operation. Thus, the actual holding force can be increased as indicated by the arrows in the figure so as to cancel the stress relaxation phenomenon of each elastic layer constituting the sensor apparatus 20. This makes it possible to stably hold the workpiece with a constant holding force regardless of the duration of the holding operation.

The correction coefficient generation section 736 may be configured by software or may be configured by any digital circuit. As the digital circuit, for example, digital filters such as finite impulse response (FIR) can be employed. If the conversion parameter is appropriately set in advance, this makes it possible to appropriately correct the stress relaxation phenomenon in which the holding force as shown in FIG. 23 decreases in a curvilinear manner from the start of holding and asymptotically approaches to a specific value.

Second Embodiment

Figure 24:
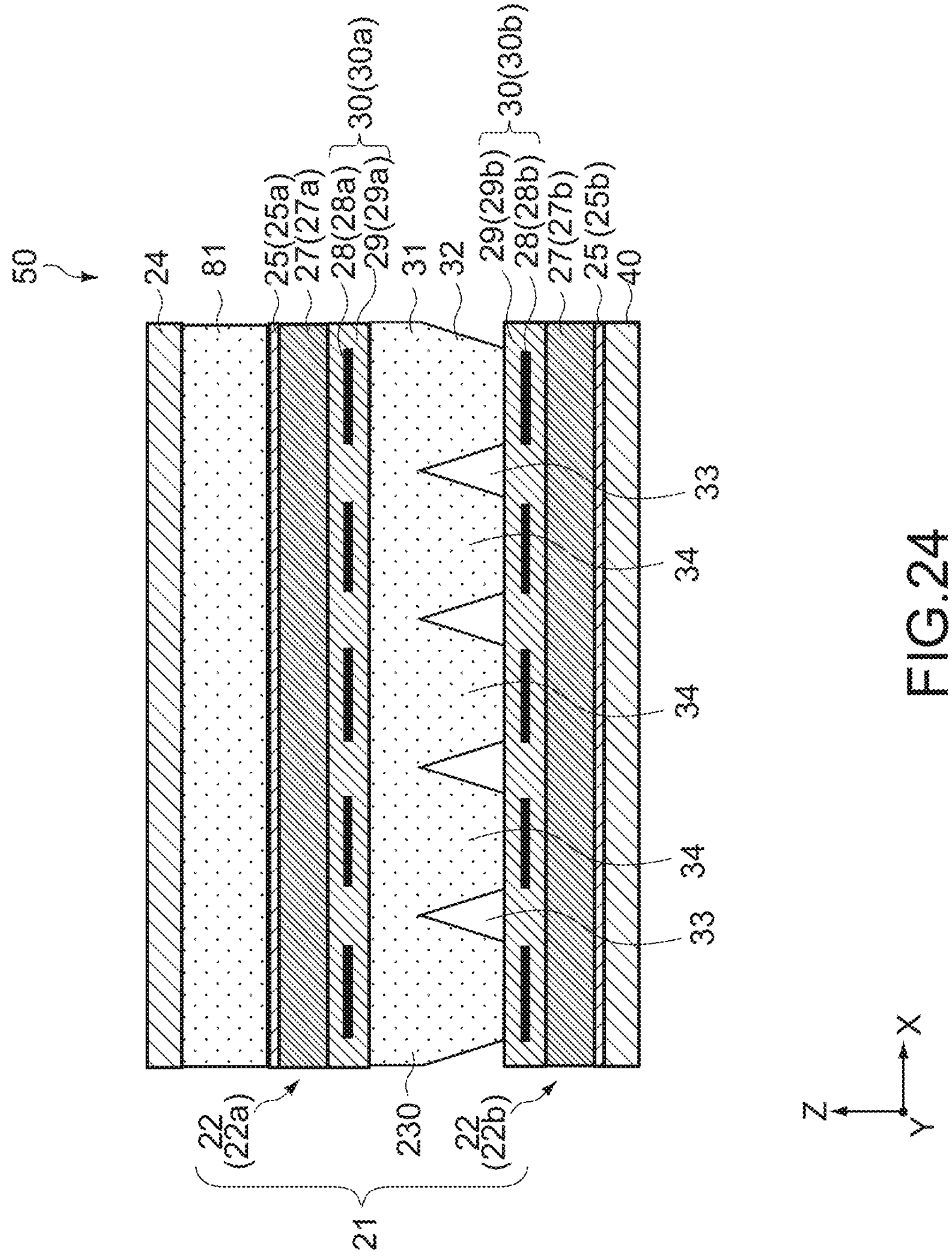
FIG. 24 is a cross-sectional side view showing a configuration of a sensor apparatus according to a second embodiment of the present technology.

FIG. 24 is a cross-sectional side view showing a configuration of a sensor apparatus 50 according to a second embodiment of the present technology. Hereinafter, configurations different from those in the first embodiment will be mainly described, and configurations similar to those in the first embodiment will be denoted by similar reference symbols, and description thereof will be omitted or simplified.

Figure 25:
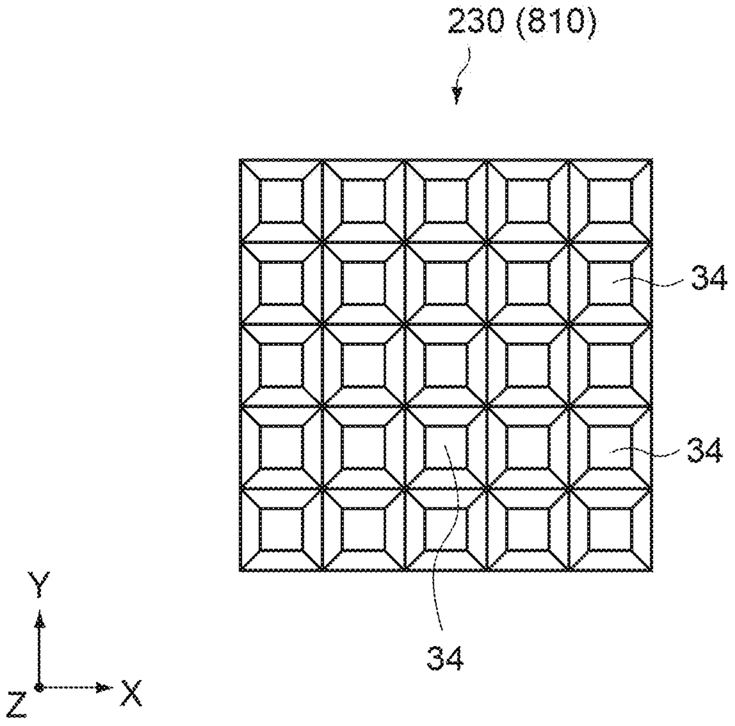
FIG. 25 is a view of a separation layer of the sensor apparatus as viewed from the rear side.

In the sensor apparatus 50 of this embodiment, the configuration of a separation layer 230 is different from that of the first embodiment. FIG. 25 is a view of the separation layer 230 of the sensor apparatus 50 as viewed from the rear side. Hereinafter, details of the separation layer 230 will be mainly described below.

The separation layer 230 includes gap portions 33 and includes a plurality of pillar portions 34 formed by the gap portions 33 and extending in the vertical direction. The gap portion 33 is provided in a groove shape that does not vertically penetrate the separation layer 230 on the back surface side (the second pressure sensor 22*b* side) of the separation layer 230.

The separation layer 230 includes an infilling layer 31 (first layer) having an infilling structure without the gap portions 33, on the front side (the first pressure sensor 22*a* side). Further, the separation layer 23 includes a pillar layer 32 (second layer) including the gap portions 33 and the plurality of pillar portions 34 formed by the gap portions 33 on the back side (on the second pressure sensor 22*b* side).

Each of the plurality of pillar portions 34 has a shape that is not constant in thickness in the vertical direction, and has a shape having a different thickness. In the example shown in FIGS. 24 and 257, the plurality of pillar portions 34 is formed so as to have a thickness gradually reduced from the front side (the first pressure sensor 22*a* side) to the back side (the second pressure sensor 22*b* side) in the vertical direction. Specifically, each of the plurality of pillar portions 34 has a shape of an inverted frustum of a quadrangular pyramid. Note that the pillar portions 34 may have a shape of, for example, an inverted frustum of a cone, an inverted frustum of a triangular pyramid, an inverted frustum of a pentagonal pyramid, or an inverted frustum of a hexagonal pyramid.

The pillar portions 34 are regularly arranged lengthwise and widthwise. Each of the pillar portions 34 is provided at a position corresponding to the sensing portion 28 in the vertical direction. Thus, the gap portions 33 used to form the pillar portions 34 are provided at positions not corresponding to the sensing portions 28 in the vertical direction. The number of pillar portions 34 is the same as the number of sensing portions 28*b* in the second pressure sensor 22*b*, that is, 25 in total with five×five (length×width). Note that the number of pillar portions 34 can be appropriately changed.

The separation layer 230 has a thickness of, for example, approximately 1000 μm to 5000 μm. The height of the pillar portion 34 in the vertical direction (that is, the depth of the groove-shaped gap portion 33) is, for example, 20% or more, 25% or more, 30% or more, 35% or more, 40% or more, or 45% or more of the thickness of the separation layer 23. Note that it is not a problem if the pillar portion 34 has a large height (for example, 100% of the thickness of the separation layer 230). However, there is a possibility that the pillar portion 34 will not work effectively if the height of the pillar portion 34 is too small (for example, a height less than 20% of the thickness of the separation layer 230).

The area (in-plane direction) of a lower surface of the pillar portion 34 (a portion being in contact with the second pressure sensor 22*b*) is set in accordance with the area of the sensing portion 28*b* of the second pressure sensor 22*b*, and is, for example, an area equal to the area of the sensing portion 28*b*.

The separation layer 230 is typically made of a viscoelastic material having viscoelastic characteristics. Examples of the material used for the separation layer 230 include a silicon gel, a urethane gel, synthetic rubber, and foam.

The sensor apparatus 50 of this embodiment configured as described above includes the separation layer 230 having the configuration as described above. This makes it possible to improve the detection sensitivity to the shear force.

In other words, since the separation layer 230 includes the gap portions 33 in this embodiment, when a shear force Fs is applied, the separation layer 230 is locally distorted in the in-plane direction in which the shear force Fs is caused, and the distortion is less transmitted to portions other than the locally distorted portion. The state of being easily locally distorted (shearing stress σ) is uniformly provided regardless of a point in the in-plane direction. Thus, in this embodiment, the detection sensitivity to the shear force Fs is uniformly provided in the in-plane direction.

Further, the separation layer 230 includes the gap portions 33 in this embodiment. Thus, the separation layer 230 is easily distorted (the shear stress σ is reduced) in response to the shear force Fs at each point in the in-plane direction, so that the detection sensitivity to the shear force Fs is improved.

Further, in this embodiment, the pillar portions 34 formed by the gap portions 33 are provided at positions corresponding to the sensing portions 28 of the second pressure sensor 22*b*. Therefore, when a vertical load Fz is applied to the sensor apparatus 20, the pillar portions 34 locally press the portions corresponding to the sensing portions 28 in the second pressure sensor 22*b*, so that such a force can be efficiently transmitted in the second pressure sensor 22*b*. Therefore, even if the load Fz in the vertical direction is small, the pressure center position Q can be precisely detected in the second pressure sensor 22*b*, and the shear force Fs can be precisely measured.

Further, the configuration of the separation layer 230 described above may be similarly applied to the viscoelastic body layer 81 as will be described later. Also in this case, the viscoelastic body layer 81 is easily distorted in response to the shear force Fs at each point of the viscoelastic body layer 81 in the in-plane direction, so that the detection sensitivity to the shear force Fs can be improved. The above-mentioned configuration of the separation layer 230 is applicable to at least one of the separation layer 23 or the viscoelastic body layer 81 in FIG. 2.

Third Embodiment

Figure 26:
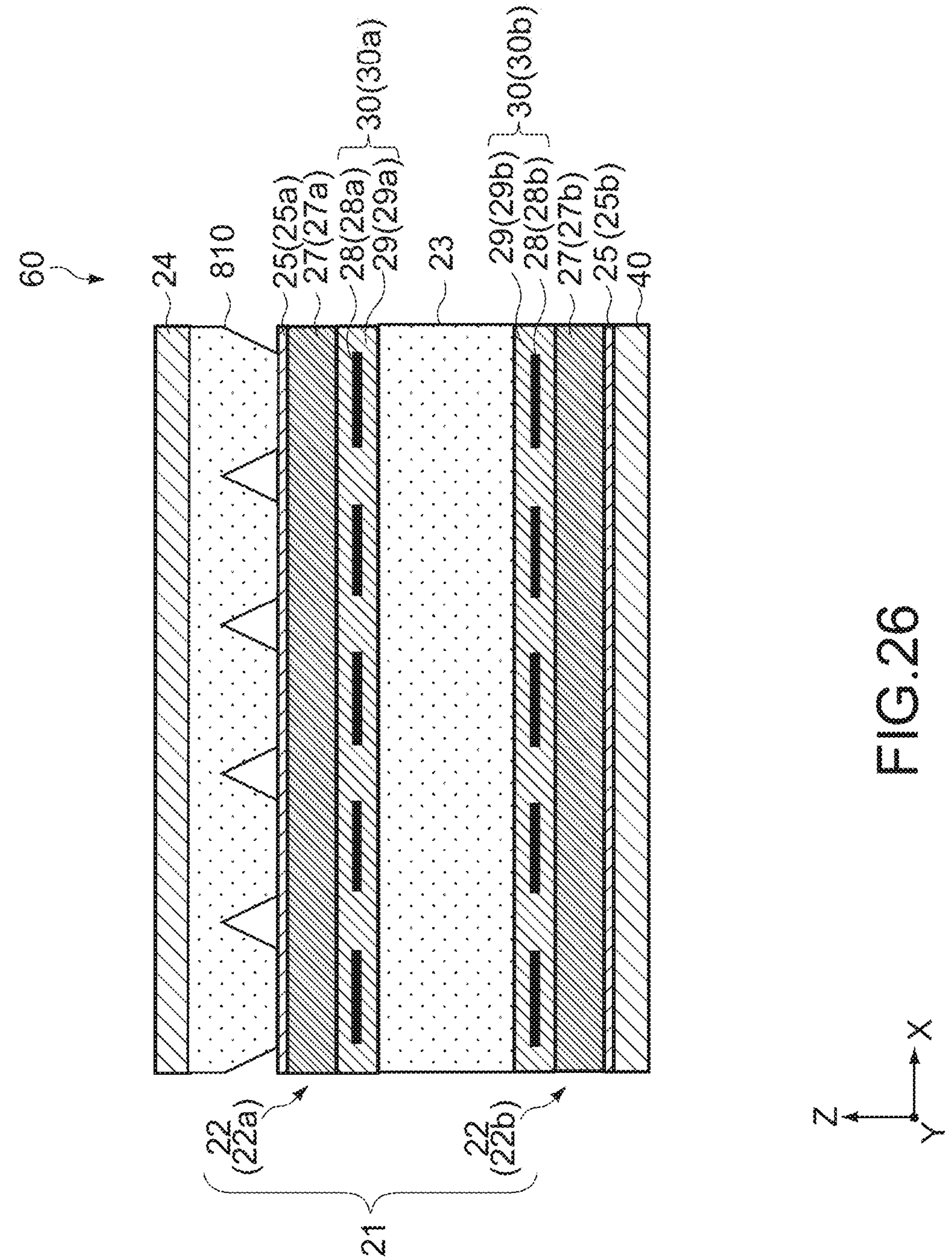
FIG. 26 is a cross-sectional side view showing a configuration of a sensor apparatus according to a third embodiment of the present technology.

FIG. 26 is a cross-sectional side view showing a configuration of a sensor apparatus 60 according to a third embodiment of the present technology. Hereinafter, configurations different from those in the first embodiment will be mainly described, and configurations similar to those in the first embodiment will be denoted by similar reference symbols, and description thereof will be omitted or simplified.

In the sensor apparatus 60 of this embodiment, the configuration of a viscoelastic body layer 810 is different from that of the first embodiment. The viscoelastic body layer 810 is configured to be similar to the separation layer 230 described in the second embodiment, and the back surface of the viscoelastic body layer 810 is formed in a concavo-convex shape as shown in FIG. 25.

In other words, the viscoelastic body layer 810 includes gap portions 33 and includes a plurality of pillar portions 34 formed by the gap portions 33 and extending in the vertical direction. The gap portion 33 is provided in a groove shape that does not vertically penetrate the viscoelastic body layer 810 on the back surface side (the second pressure sensor 22*b* side) of the viscoelastic body layer 810. Each of the plurality of pillar portions 34 has a shape that is not constant in thickness in the vertical direction, and has a shape having a different thickness. In the example shown in FIG. 26, the plurality of pillar portions 34 is formed so as to have a thickness gradually reduced from the front side (the surface layer 24 side) to the back side (the first pressure sensor 22*a* side) in the vertical direction. Specifically, each of the plurality of pillar portions 34 has a shape of an inverted frustum of a quadrangular pyramid. Note that the pillar portions 34 may have a shape of, for example, an inverted frustum of a cone, an inverted frustum of a triangular pyramid, an inverted frustum of a pentagonal pyramid, or an inverted frustum of a hexagonal pyramid.

The pillar portions 34 are regularly arranged lengthwise and widthwise. Each of the pillar portions 34 is provided at a position corresponding to the sensing portion 28 in the vertical direction. Thus, the gap portions 33 used to form the pillar portions 34 are provided at positions not corresponding to the sensing portions 28 in the vertical direction. The number of pillar portions 34 is the same as the number of sensing portions 28*b* in the second pressure sensor 22*b*, that is, 25 in total with five×five (length×width). Note that the number of pillar portions 34 can be appropriately changed.

The viscoelastic body layer 810 has a thickness of, for example, approximately 1000 μm to 5000 μm. The height of the pillar portion 34 in the vertical direction (that is, the depth of the groove-shaped gap portion 33) is, for example, 20% or more, 25% or more, 30% or more, 35% or more, 40% or more, or 45% or more of the thickness of the viscoelastic body layer 810. Note that it is not a problem if the pillar portion 34 has a large height (for example, 100% of the thickness of the viscoelastic body layer 810). However, there is a possibility that the pillar portion 34 will not work effectively if the height of the pillar portion 34 is too small (for example, a height less than 20% of the thickness of the viscoelastic body layer 810).

The area (in-plane direction) of a lower surface of the pillar portion 34 (a portion being in contact with the first pressure sensor 22*a*) is set in accordance with the area of the sensing portion 28*a* of the first pressure sensor 22*a*, and is, for example, an area equal to the area of the sensing portion 28*a*.

The viscoelastic body layer 810 is typically made of a viscoelastic material having viscoelastic characteristics. Examples of the material used for the separation layer 810 include a silicon gel, a urethane gel, synthetic rubber, and foam. For the shape of the viscoelastic body layer 810, various shapes can be employed similarly to the separation layer 230 in the second embodiment described above.

Also in the sensor apparatus 60 of this embodiment configured as described above, similarly to the second embodiment described above, it is possible to improve the detection sensitivity to the shear force. In other words, since the viscoelastic body layer 810 includes the gap portions 33 in this embodiment, when a shear force Fs is applied, the viscoelastic body layer 810 is locally distorted in the in-plane direction in which the shear force Fs is caused, and the distortion is less transmitted to portions other than the locally distorted portion. The state of being easily locally distorted (shearing stress σ) is uniformly provided regardless of a point in the in-plane direction. Thus, in this embodiment, the detection sensitivity to the shear force Fs is uniformly provided in the in-plane direction.

Fourth Embodiment

Figure 27:
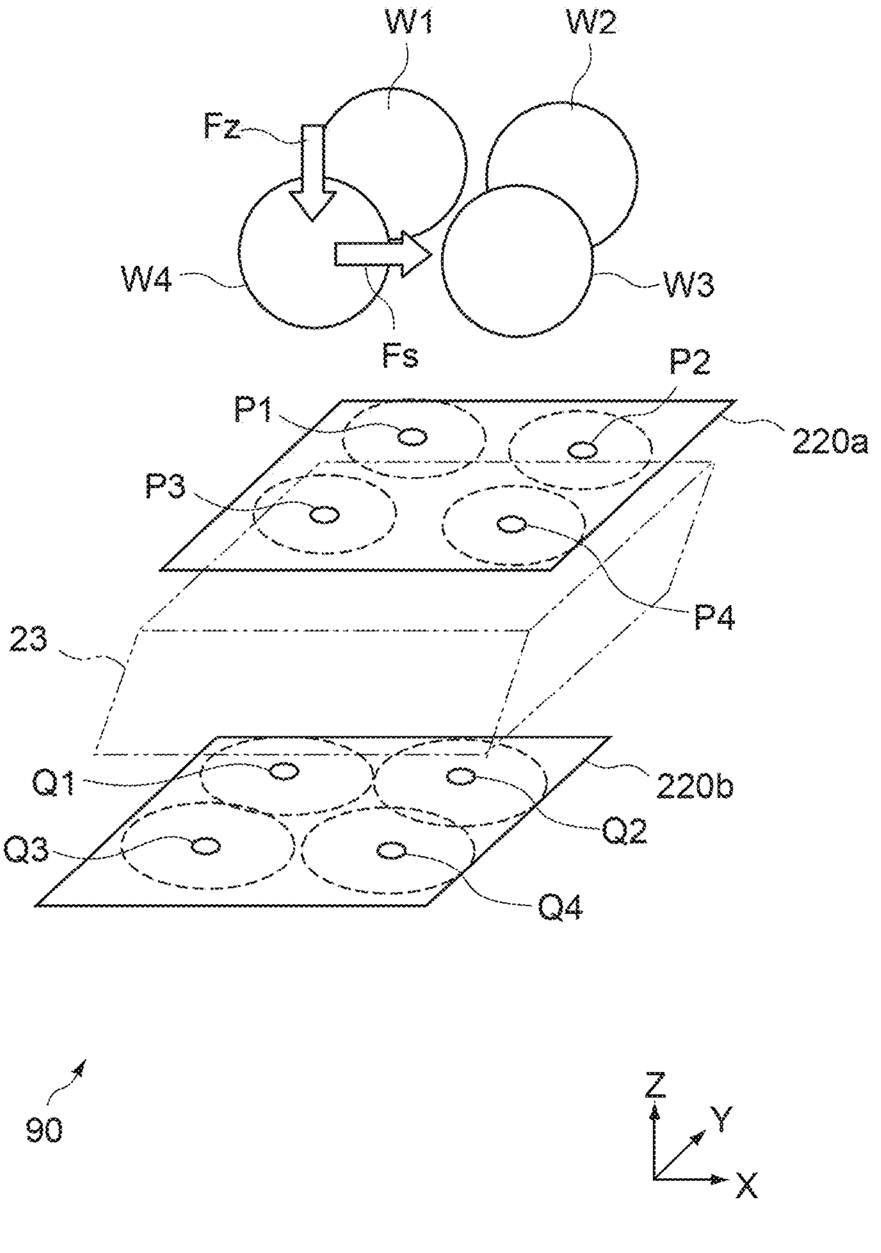
FIG. 27 is a perspective view schematically showing a sensor apparatus according to a fourth embodiment of the present technology.

FIG. 27 is a perspective view schematically showing a sensor apparatus 90 according to a fourth embodiment of the present technology. As in the first embodiment, a sensor apparatus 90 of this embodiment includes a first pressure sensor 220*a* on the upper layer side that is the sensing surface side, a second pressure sensor 220*b* on the lower layer side, and a separation layer 23 disposed between the first pressure sensor 220*a* and the second pressure sensor 220*b*. Note that the illustration of a viscoelastic body layer 81 disposed on the upper layer side of the first pressure sensor 220*a* is omitted.

Here, a state is shown, in which through four pushers W1 to W4, a vertical load Fz in the Z-axis direction and a shear force Fs in the X-axis direction simultaneously act on the sensor apparatus 90. Four points P1 to P4 on the first pressure sensor 220*a* and four points Q1 to Q4 on the second pressure sensor 220*b* respectively represent center positions at which the pressures acting through the pushers W1 to W4 are detected (pressure center positions).

Figure 28:
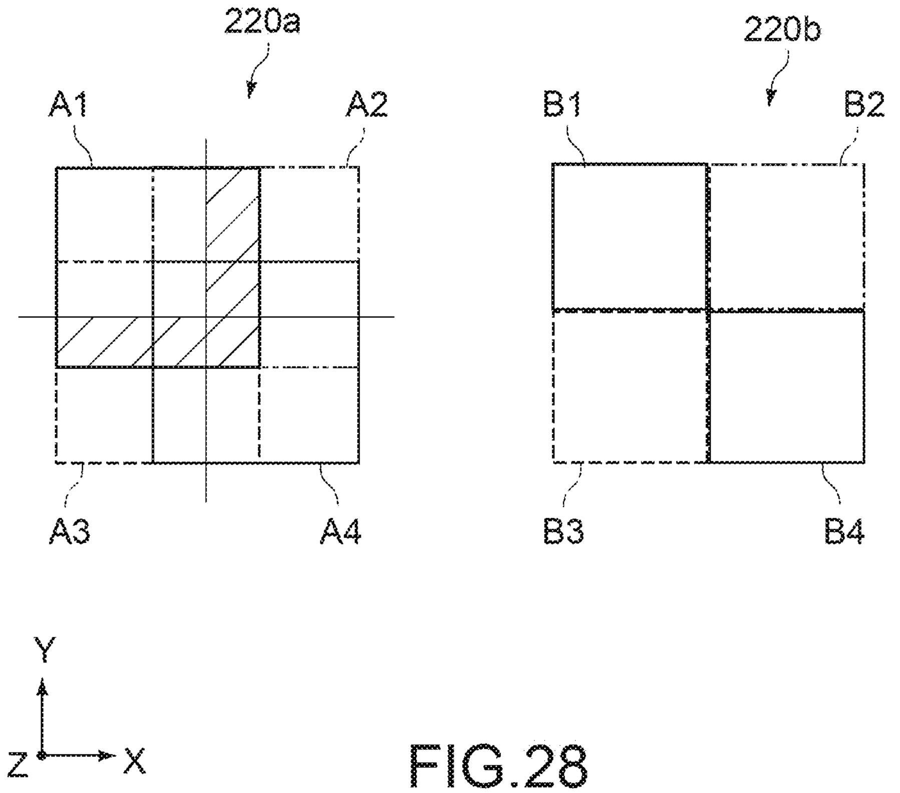
FIG. 28 is a schematic plan view parallel to the XY-plane, showing division examples of detection regions of a first pressure sensor and a second pressure sensor of the sensor apparatus.

This embodiment is different from the first embodiment described above in that each of the first pressure sensor 220*a* and the second pressure sensor 220*b* is divided into a plurality of detection regions. FIG. 28 is a schematic plan view parallel to the XY-plane, showing division examples of the detection regions of the first pressure sensor 220*a* and the second pressure sensor 220*b*.

As shown in FIG. 28, the first pressure sensor 220*a* is divided into four detection regions A1 to A4, and the second pressure sensor 220*b* is also divided into four detection regions B1 to B4. A vertical load Fz and a shear force Fs that act on the detection region A1 of the first pressure sensor 220*a* through the pusher W1 are detected in the detection region B1 of the second pressure sensor 220*b*. Similarly, vertical loads Fz and shear forces Fs that act on the detection regions A2 to A4 of the first pressure sensor 220*a* through the pushers W2 to W4 are respectively detected in the detection regions B2 to B4 of the second pressure sensor 220*b*.

The first pressure sensor 220*a* and the second pressure sensor 220*b* are divided into the plurality of detection regions A1 to A4 and the plurality of detection regions B1 to B4, respectively, which makes it possible to accurately detect the loads and shear forces that act on the detection regions without each detection region being affected by another detection region.

Figure 29:
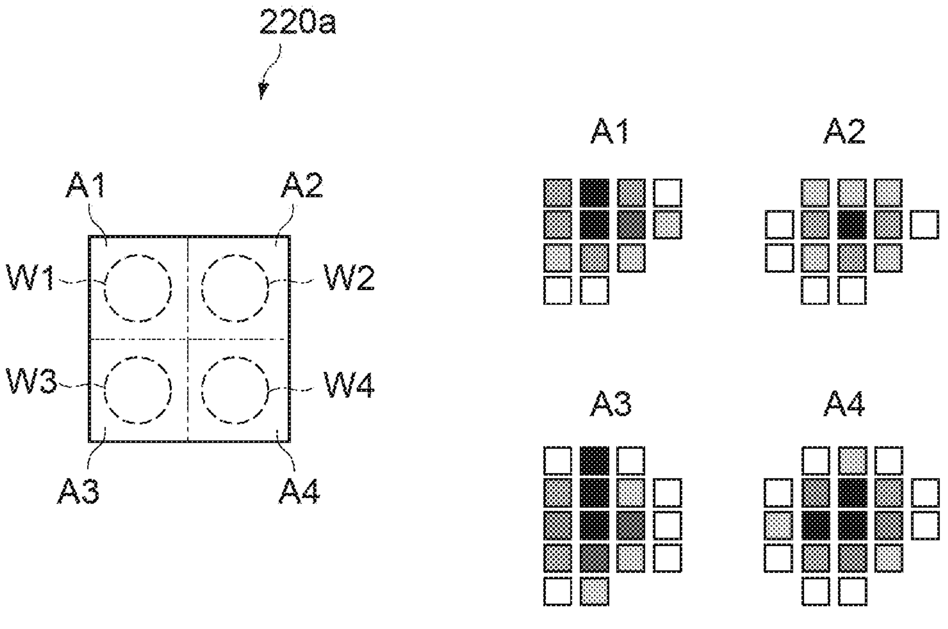
FIG. 29 is a schematic view showing distributions of pressures in the respective detection regions of the first pressure sensor.

For example, FIG. 29 schematically shows the distributions of pressures in the respective detection regions A1 to A4 of the first pressure sensor 220*a* through the pushers W1 to W4. On the right in the figure, a plurality of square regions in each of the detection regions A1 to A4 corresponds to the sensing portions 28 (see FIG. 3) that are nodes, and pressure detection values thereof are represented by grayscale (darker represents a higher pressure detection value, and lighter represents a lower pressure detection value).

Figure 30:
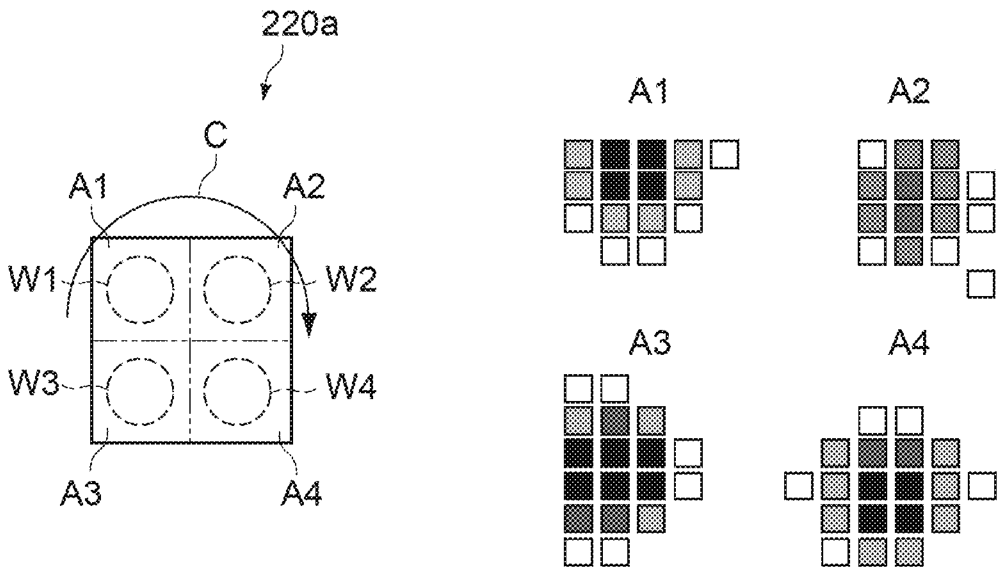
FIG. 30 is a schematic view showing pressure distributions in the respective detection regions of the first pressure sensor.

When the pushers W1 to W4 are rotated about the same rotational axis in this state while being pressed with the hand as indicated by the arrow C on the left in FIG. 30, the distribution of pressure in each of the detection regions A1 to A4 changes, for example, as shown on the right in FIG. 30. In other words, this case indicates that a region that exhibits a high pressure expands in each of the detection regions A1 to A4, and the pressure center positions of the respective detection regions A1 to A4 move along the moving directions of the pushers W1 to W4.

Figure 31:
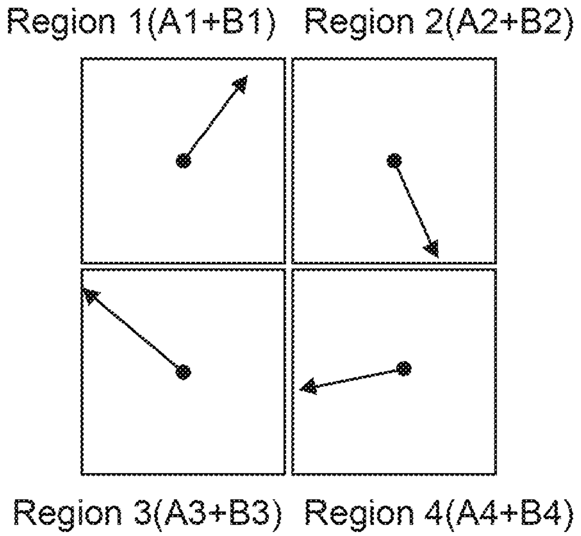
FIG. 31 is a diagram for describing an in-plane distribution of a shear force in each detection region.

Further, FIG. 31 shows in-plane distributions of shear forces in the four detection regions (regions 1 to 4), which are determined in consideration of temporal changes in the respective pressure center positions in the detection regions B1 to B4 of the second pressure sensor 220*b*.

In this embodiment, the detection regions A1 to A4 of the first pressure sensor 220*a* are set such that a portion of a certain region overlaps with a portion of another region. When a detection surface of the first pressure sensor 220*a* is equally divided into four with two in length and two in width, portions of detection region A1 are set so as to overlap with portions of the other detection regions A2 and A3 adjacent thereto in a width direction and a length direction, as indicated by hatching, for example, on the left in FIG. 28. Thus, the number of sensors (the number of sensing portions 28) in each detection region is increased. This makes it possible to, for example, prevent pressure detection data on a peripheral edge of the detection region from missing and improve the detection accuracy at the pressure center positions P1 to P4.

Note that the present technology is not limited to the above, and each of the detection regions A1 to A4 may be provided without overlapping with each other, as in the case of the divided regions B1 to B4 of the second pressure sensor 220*b*.

The first pressure sensor 220*a* and the second pressure sensor 220*b* are divided into the four detection regions A1 to A4 and B1 to B4, respectively, but the present technology is not limited thereto and may be divided into two, three, or five or more regions.

The number of divisions and the size (extent) of the detection regions A1 to A4 and B1 to B4 may be set in advance, or may be variably set in accordance with the number, position, and the like of loads acting on the first pressure sensor 220*a*. In this case, it is possible to optimize the setting of the detection regions in a case where the load acting on the sensor apparatus 90 changes from moment to moment. Thus, it is possible to detect a pressure or shear force distribution with high accuracy.

Note that the sensing portions 28 constituting the first pressure sensor 220*a* and the second pressure sensor 220*b* do not necessarily exhibit a linear change in capacitance with respect to the pressing force in some cases. Thus, a correction algorithm that linearly approximates a change in capacitance that is exhibited by each sensing portion 28 with respect to a pressing force may be employed.

Figure 32:
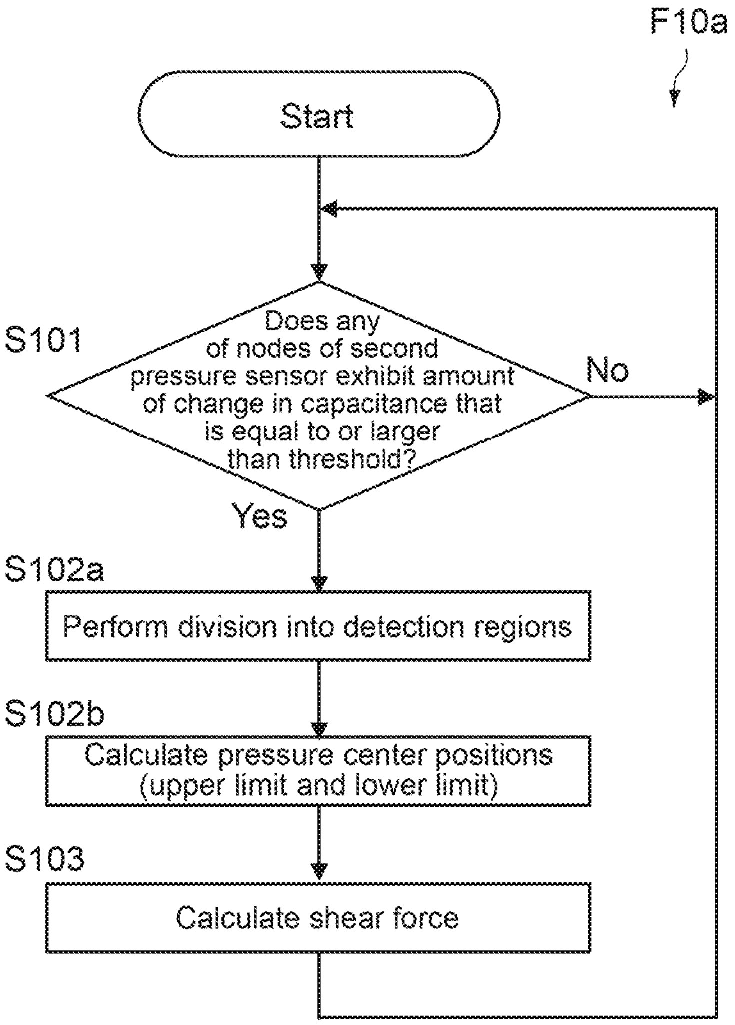
FIG. 32 is a flowchart showing a processing procedure of calculating a shear force in each detection region.
Figure 33:
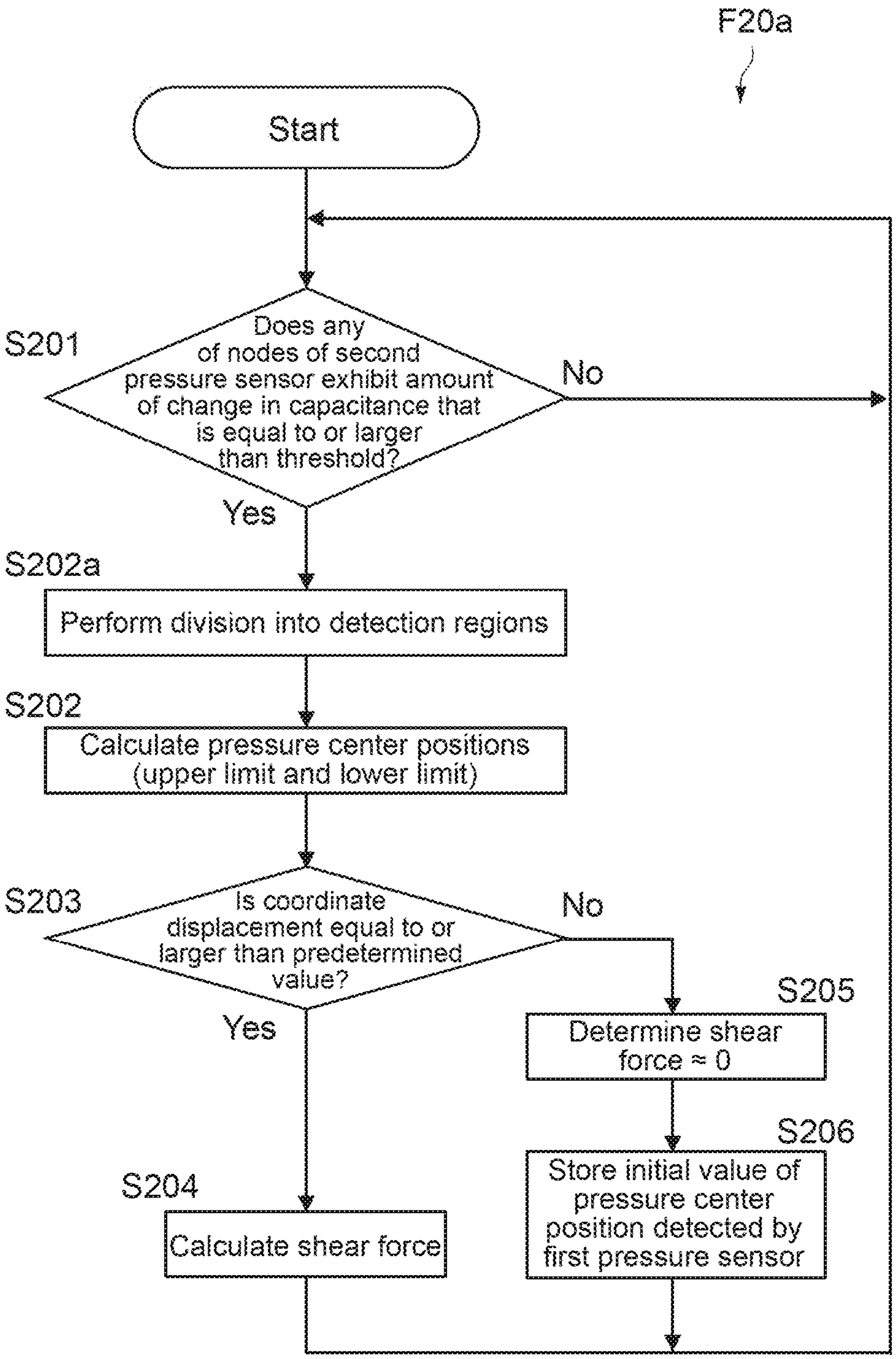
FIG. 33 is another flowchart showing a processing procedure of calculating a shear force in each detection region.

FIGS. 32 and 33 are flowcharts each showing a processing procedure of calculating a shear force detected in each of the detection regions A1 to A4 and B1 to B4, the processing procedure being performed in the control unit 70 (see FIG. 3).

A processing procedure F10*a* shown in FIG. 32 is a processing procedure similar to the processing procedure F10 shown in FIG. 8, and a processing procedure F20*a* shown in FIG. 33 is a processing procedure similar to the processing procedure F20 shown in FIG. 13.

In both the cases, if any of the sensing sections 28 (nodes) of the second pressure sensor 220*b* exhibits an amount of change in capacitance that is equal to or larger than a threshold (Yes in Steps 101 and 201), the first pressure sensor 220*a* and the second pressure sensor 220*b* are respectively divided into a plurality of detection regions A1 to A4 and B1 to B4 (Steps 102*a* and 202*a*). After that, pressure center positions P1 to P4 and Q1 to Q4 are calculated for the respective divided detection regions to calculate shear forces Fs acting on the respective detection regions (Steps 102*b*, 202*b*, 103, and 204).

Note that the sensor apparatus 90 of this embodiment is applicable not only to the sensor apparatus described in the first embodiment but also to the sensor apparatuses in the second to third embodiments.

Modified Examples

In the embodiments described above, the sensor apparatus in which the viscoelastic body layer 81 or 810 is disposed on the front surface side of the first pressure sensor 22*a* has been exemplified, but the installation of the viscoelastic body layer 81 or 810 may be omitted. Further, the sensor portion 21 includes the two pressure sensors (first pressure sensor 22*a* and second pressure sensor 22*b*), but the sensor apparatus may include any one of the pressure sensors. In this case, the installation of the separation layer 23 or 230 can be omitted.

Further, in the embodiments described above, a hold command supplied to the drive unit 12*a* that drives the finger portions 3*a* of the hand portion 3 is generated by the control unit 70 of the sensor apparatus, but instead of this, it may be performed by the controller 11 that controls the entire operation of the robot apparatus 10. In this case, the controller 11 corresponds to a control device that includes a signal generation section that generates a correction signal for correcting a holding force on the basis of a pressure value calculated by the control unit 70 and a duration of a holding operation.

Note that the present technology can also take the following configurations.

(1) A robot apparatus, including:

a hand portion including at least two finger portions each having a holding surface capable of holding a workpiece;

an elastically deformable sensor portion that is disposed on the holding surface of at least one finger portion of the two finger portions and includes a plurality of detection elements that detects a pressure acting on the holding surface; and a control device including a signal generation section capable of generating a hold command to cause the hand portion to hold the workpiece with a predetermined holding force and capable of correcting the holding force on the basis of an output of the sensor portion and a duration of an operation of holding the workpiece.

(2) The robot apparatus according to (1), in which the signal generation section calculates a correction coefficient for correcting the holding force on the basis of drift characteristics of the output of the sensor portion with respect to a constant load acquired in advance.

(3) The robot apparatus according to (2), in which the signal generation section generates the hold command on the basis of an addition value of a pressure value, which is calculated on the basis of a sum of outputs of the plurality of detection elements, and a correction value, which is obtained by multiplying the pressure value by the correction coefficient.

(4) The robot apparatus according to any one of 81) to (3), in which the control device further includes a computing section that calculates a load vertical to the holding surface and a shear force parallel to the holding surface on the basis of the output of the sensor portion.

(5) The robot apparatus according to any one of (1) to (4), in which the hand portion further includes an actuator capable of driving the finger portions at a minimum feed rate of less than 100 μm, and the control device controls the actuator in a position control cycle of 20 Hz or more.

(6) The robot apparatus according to any one of (1) to (5), in which the sensor portion includes a first pressure sensor located on the workpiece side, a second pressure sensor located on the holding surface side, and a separation layer that is disposed between the first pressure sensor and the second pressure sensor and is made of a viscoelastic material that is deformed by a load applied to the first pressure sensor.

(7) The robot apparatus according to (6), in which each of the first pressure sensor and the second pressure sensor includes a sensor electrode layer including a plurality of capacitive elements two-dimensionally disposed in a plane parallel to the holding surface, a reference electrode layer, and a deformation layer disposed between the sensor electrode layer and the reference electrode layer.

(8) The robot apparatus according to (6) or (7), in which the sensor portion further includes a viscoelastic body layer that is disposed on a surface of the first pressure sensor and made of a viscoelastic material that is deformable on the first pressure sensor in an in-plane direction parallel to the holding surface.

(9) A sensor apparatus, including:

an elastically deformable sensor portion that is disposed on a holding surface of a hand portion of a robot apparatus and detects a pressure acting on the holding surface; and a control device including a signal generation section capable of generating a hold command to cause the hand portion to hold a workpiece with a constant holding force and capable of correcting the holding force on the basis of an output of the sensor portion and a duration of an operation of holding the workpiece.

(10) A control device, including a signal generation section capable of generating a hold command to cause a hand portion of a robot apparatus to hold a workpiece with a constant holding force and capable of correcting the holding force on the basis of an output of an elastically deformable sensor portion that detects a pressure acting on a holding surface of the hand portion, and a duration of an operation of holding the workpiece.

REFERENCE SIGNS LIST

10 robot apparatus
11 controller
12 drive section
12*a* drive unit
20, 50, 60 sensor apparatus
21 sensor portion
22, 221 pressure sensor
23, 230 separation layer
25 reference electrode layer
27 deformation layer
28 sensing portion
30 sensor electrode layer
70 control unit
72 computing section
73 signal generation section
81, 810 viscoelastic body layer
736 correction coefficient generation section

What is claimed is:

1. A robot apparatus, comprising:
a hand portion including at least two finger portions each having a holding surface capable of holding a workpiece;
an elastically deformable sensor portion that is disposed on the holding surface of at least one finger portion of the at least two finger portions, wherein the elastically deformable sensor portion includes a plurality of detection elements that detect a pressure acting on the holding surface,
wherein the sensor portion includes:
a surface layer;
a body layer;
a first pressure sensor located on a workpiece side of the sensor portion, wherein the body layer is disposed between the surface layer and the first pressure sensor, the first pressure sensor including, in order from the body layer:
a reference electrode layer;
a deformation layer; and
a sensor electrode layer;
a separation layer, wherein the separation layer is made of a material that is deformed by a load applied to the first pressure sensor;
a second pressure sensor located on a holding surface side of the sensor portion, wherein the separation layer is disposed between the first pressure sensor and the second pressure sensor, the second pressure sensor including, in order from the separation layer:
a sensor electrode layer;
a deformation layer; and
a reference electrode layer; and
a control device including a signal generation section capable of generating a hold command to cause the hand portion to hold the workpiece with a predetermined holding force and to cause a correction of the holding force on a basis of an output of the sensor portion and a duration of an operation of holding the workpiece.

2. The robot apparatus according to claim 1, wherein
the signal generation section is further capable of calculating a correction coefficient and applies the correction coefficient to correct the holding force on a basis of drift characteristics of the output of the sensor portion with respect to a constant load acquired in advance.

3. The robot apparatus according to claim 2, wherein
the signal generation section is further capable of generating a hold command to cause the hand portion to hold the workpiece with the predetermined holding force on a basis of an addition value of a pressure value, which is calculated on a basis of a sum of outputs of the plurality of detection elements, and a correction value, which is obtained by multiplying the pressure value by the correction coefficient.

4. The robot apparatus according to claim 1, wherein
the control device further includes
a computing section that is capable of calculating a load vertical to the holding surface and a shear force parallel to the holding surface on a basis of the output of the sensor portion.

5. The robot apparatus according to claim 1, wherein
the hand portion further includes
an actuator capable of driving the finger portions, and
the control device is further capable of supplying the actuator using a position control cycle of 20 Hz or more.

6. The robot apparatus according to claim 1, wherein
the separation layer is made of a viscoelastic material.

7. The robot apparatus according to claim 6, wherein the sensor electrode layer of each of the first pressure sensor and the second pressure sensor includes a plurality of capacitive elements two-dimensionally disposed in a plane parallel to the holding surface.

8. The robot apparatus according to claim 6, wherein
the body layer is made of a viscoelastic material that is deformable on the first pressure sensor in an in-plane direction parallel to the holding surface.

9. The robot apparatus according to claim 1, wherein a vertical load amount, where vertical is a direction normal to a workpiece surface side of the sensor portion, can be calculated from a sum of a load acquired by the first pressure sensor and a load acquired by the second pressure sensor, wherein a shear load amount can be calculated from a displacement between a location of a first pressure center position within an area of the first pressure sensor and a location of a second pressure center position within an area of the second pressure sensor, and wherein the calculated load amounts can be applied to vary the pressure acting on the holding surface.

10. An apparatus, comprising:
an elastically deformable sensor portion that is disposed on a holding surface of a hand portion of a robot apparatus and detects a pressure acting on the holding surface,
wherein the sensor portion includes:
a surface layer;
a body layer;
a first pressure sensor located on a workpiece side of the sensor portion, wherein the body layer is disposed between the surface layer and the first pressure sensor, the first pressure sensor including, in order from the body layer:
a reference electrode layer;
a deformation layer; and
a sensor electrode layer;
a separation layer, wherein the separation layer is made of a material that is deformed by a load applied to the first pressure sensor;
a second pressure sensor located on a holding surface side of the sensor portion, wherein the separation layer is disposed between the first pressure sensor and second pressure sensor, the second pressure sensor including, in order from the separation layer:

a sensor electrode layer;

a deformation layer; and a reference electrode layer; and a control device including a signal generation section capable of generating a hold command to cause the hand portion to hold a workpiece with a constant holding force and capable of correcting the holding force on a basis of an output of the sensor portion and a duration of an operation of holding the workpiece.

* * * * *